Oct. 13, 1942.   W. C. PFEIFFER   2,298,410
MANIFOLDING MACHINE
Filed Feb. 23, 1939   21 Sheets-Sheet 5
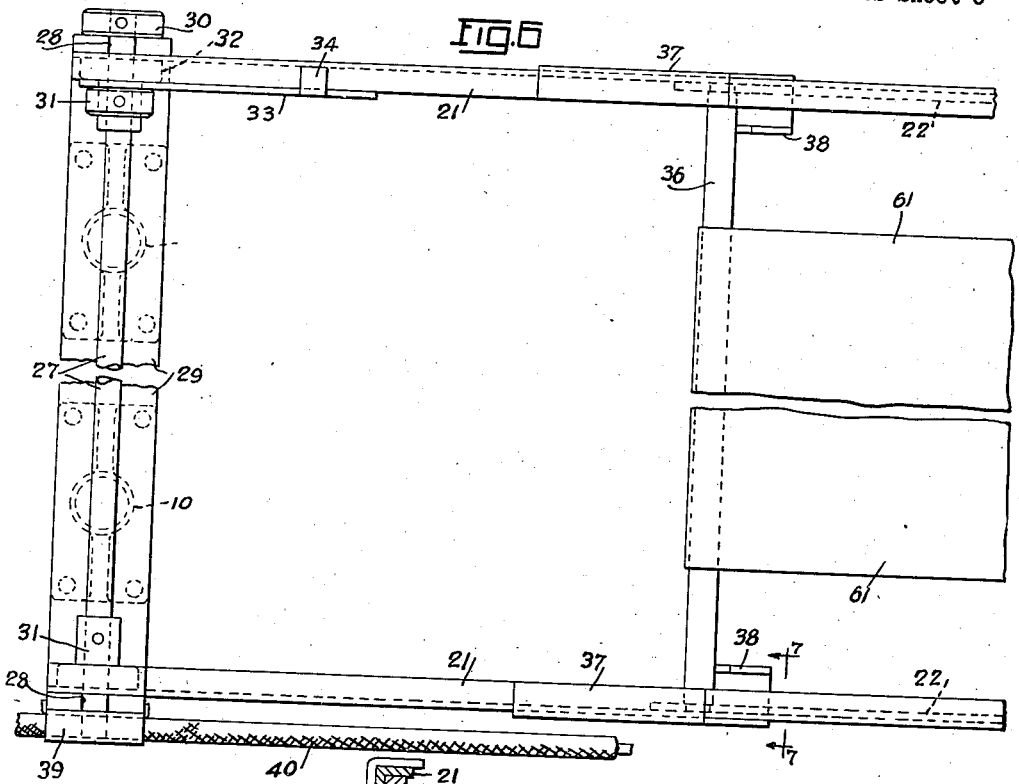
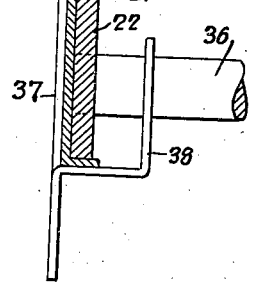
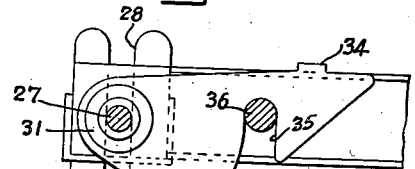
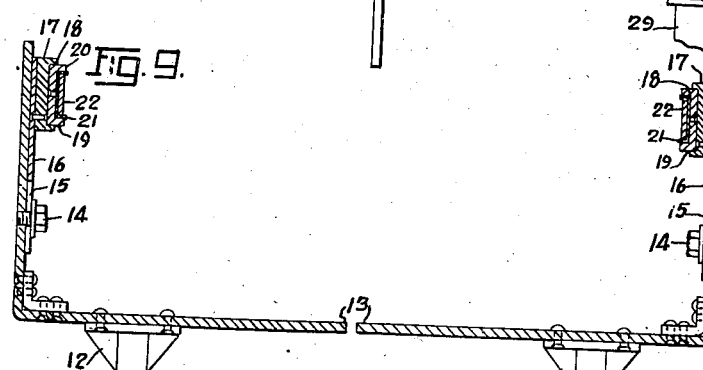
WILLIAM C. PFEIFFER, Inventor
Taulmin & Taulmin
Attorneys Oct. 13, 1942.  W. C. PFEIFFER  2,298,410
MANIFOLDING MACHINE
Filed Feb. 23, 1939  21 Sheets-Sheet 6
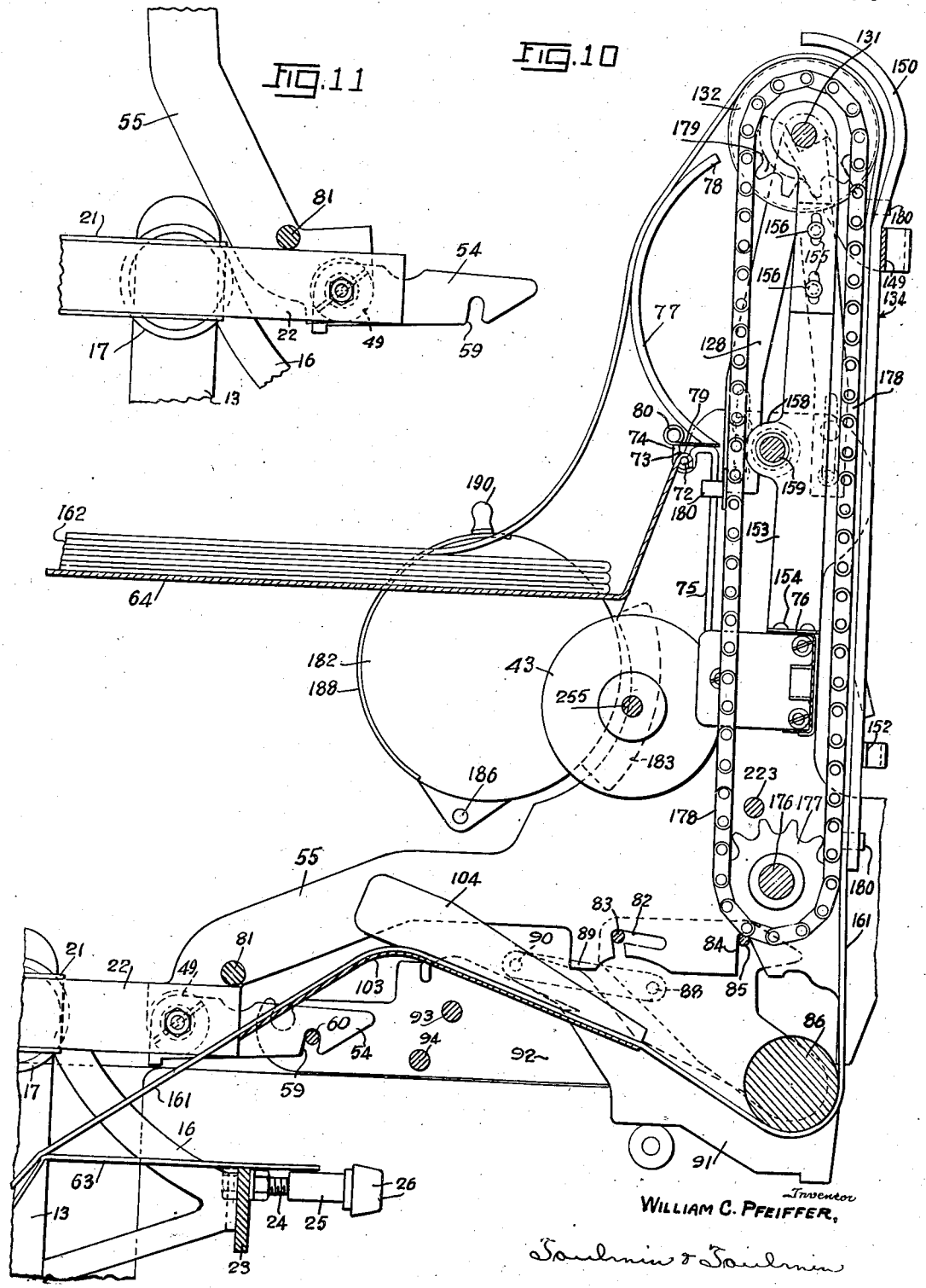
WILLIAM C. PFEIFFER, Inventor
Toulmin & Toulmin
Attorneys

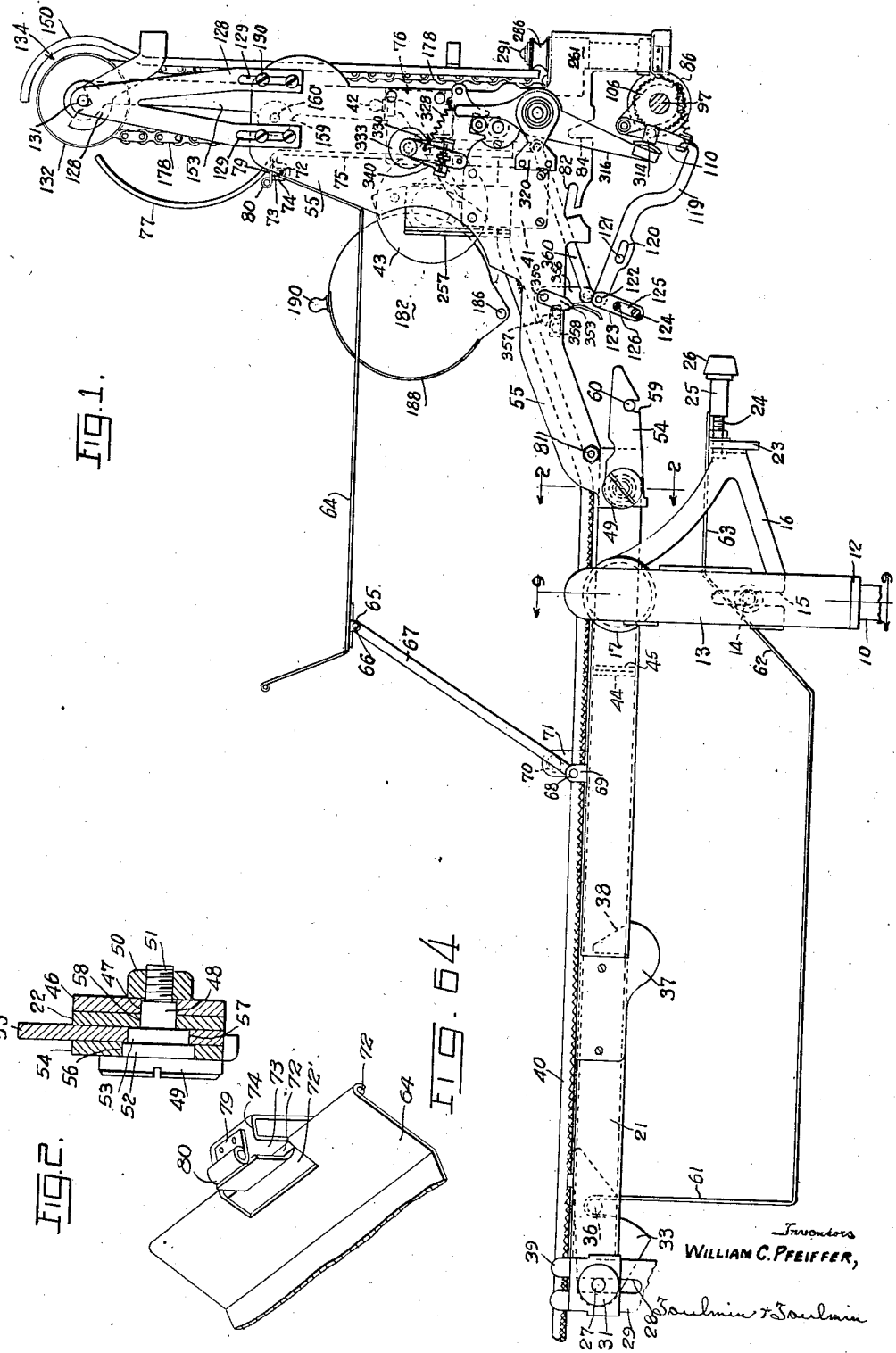

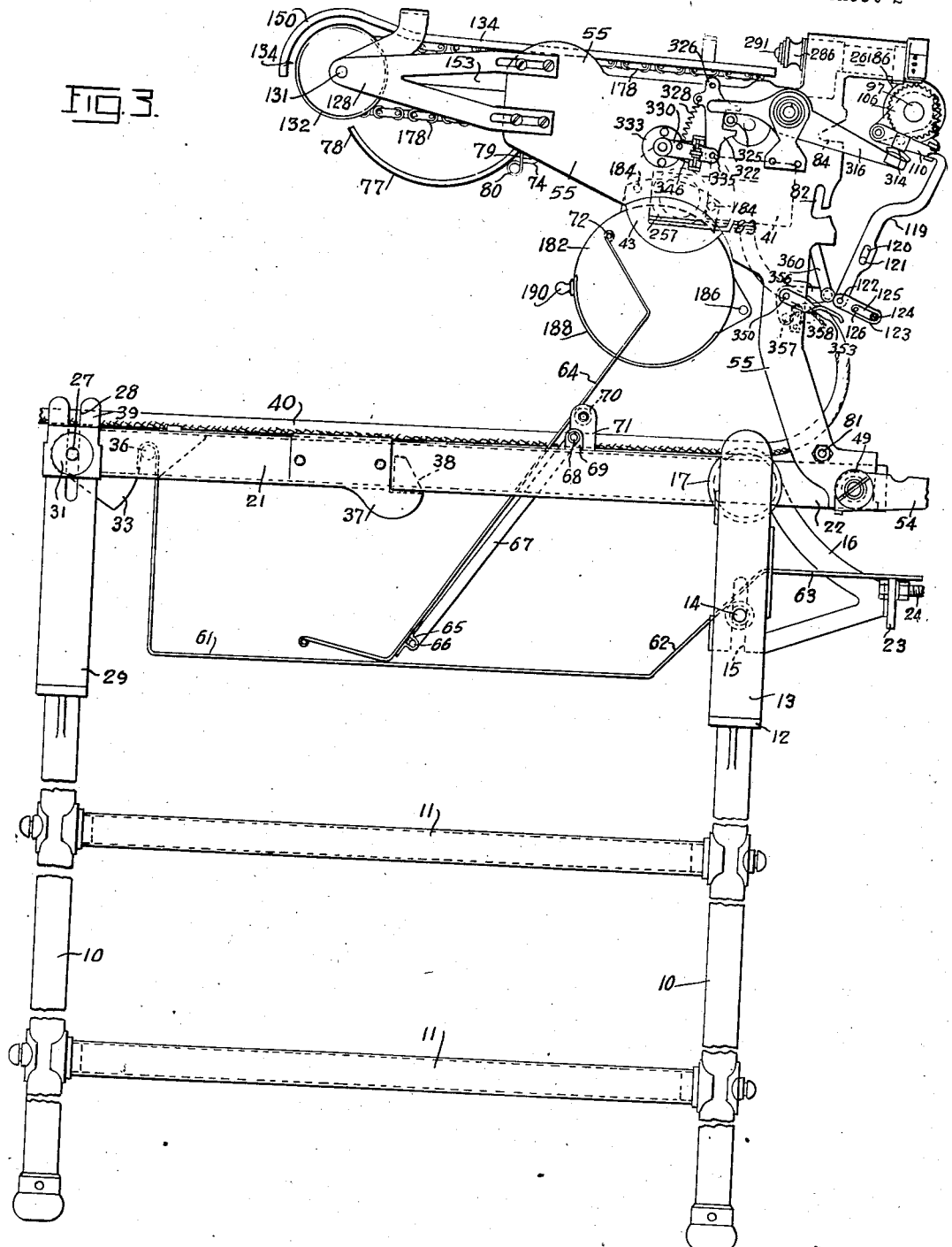

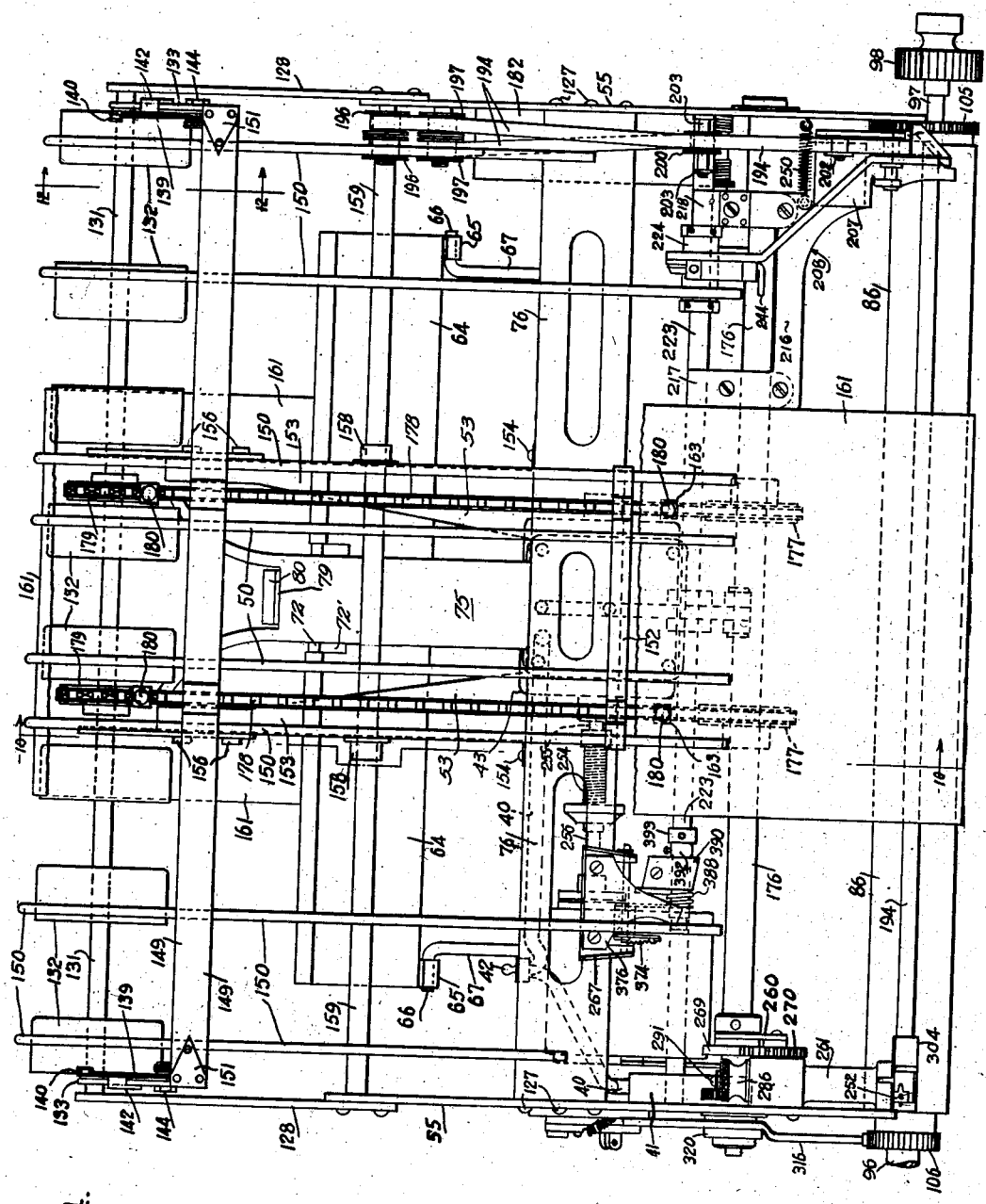

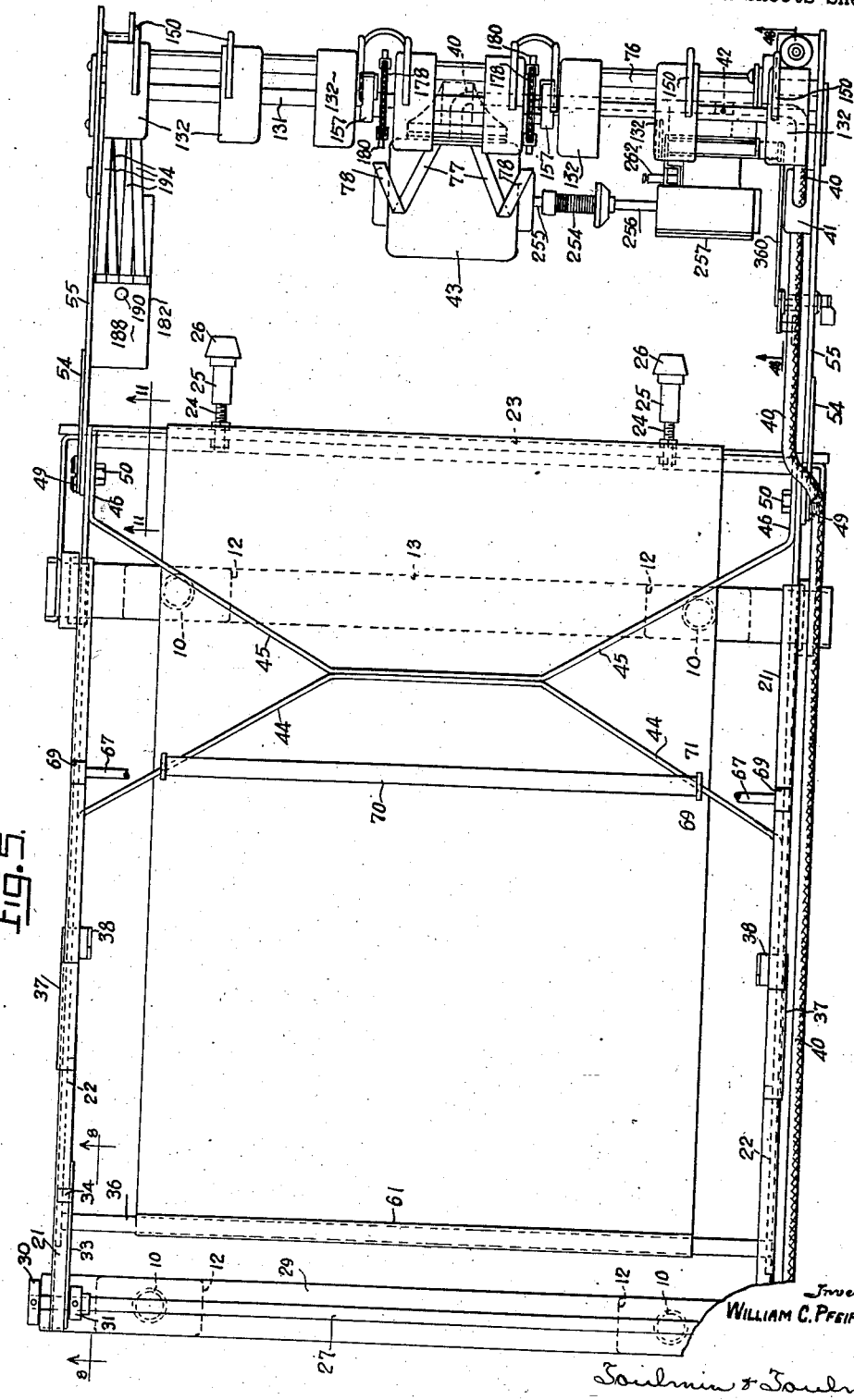

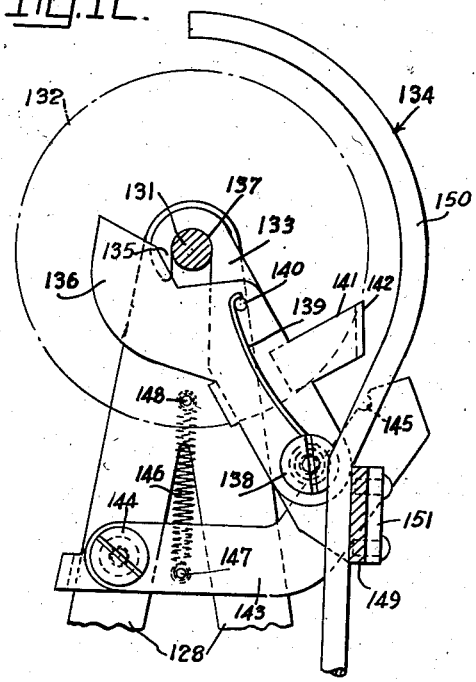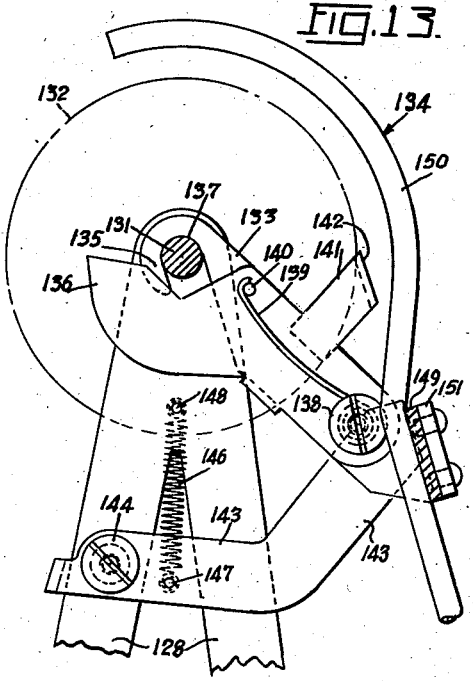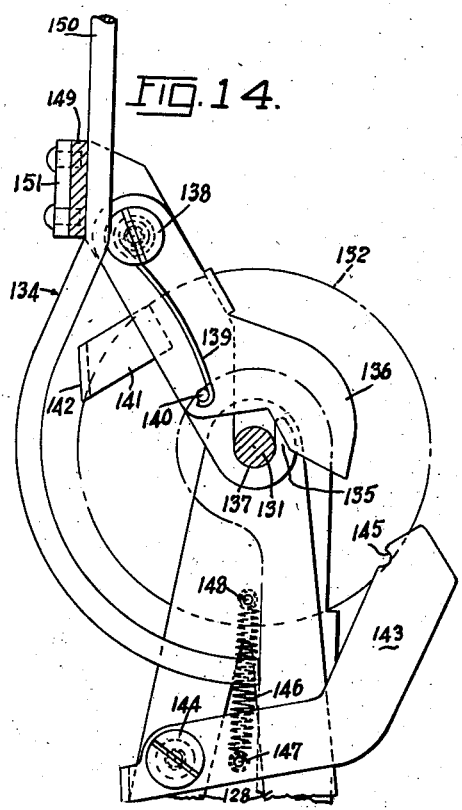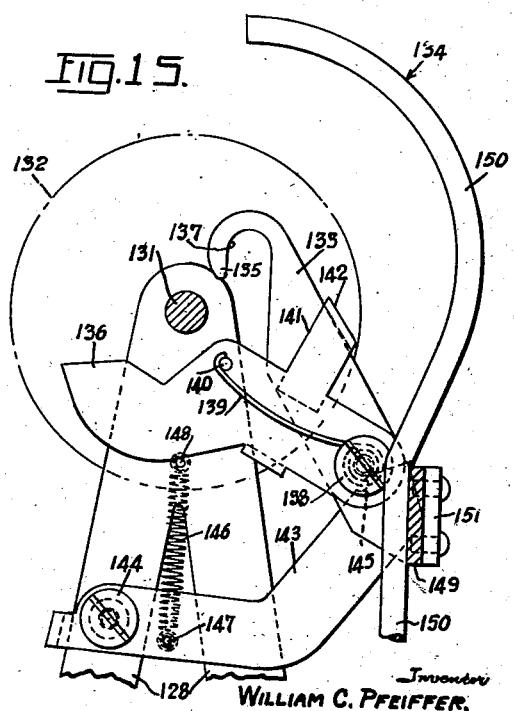

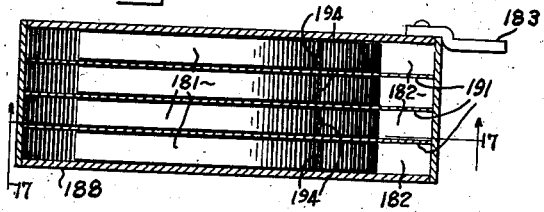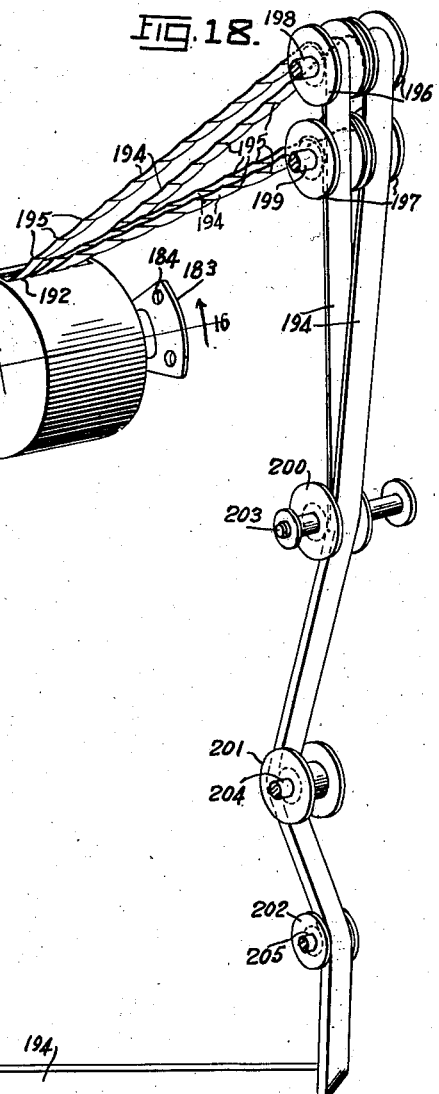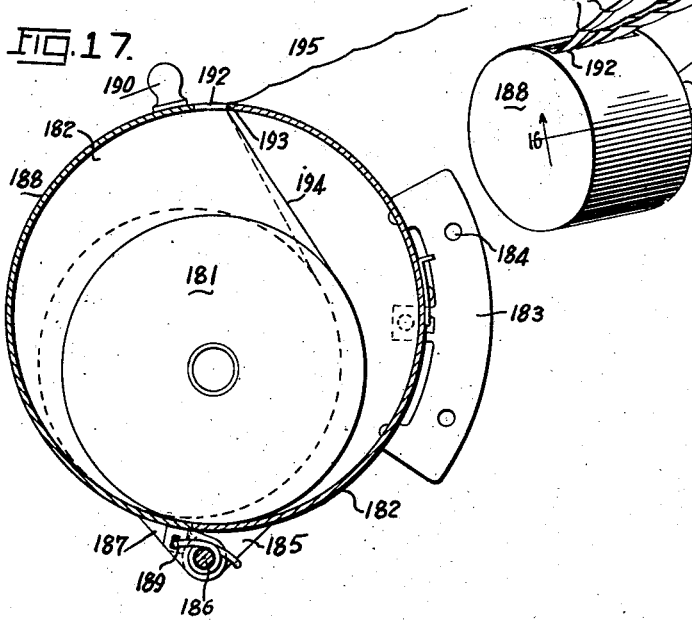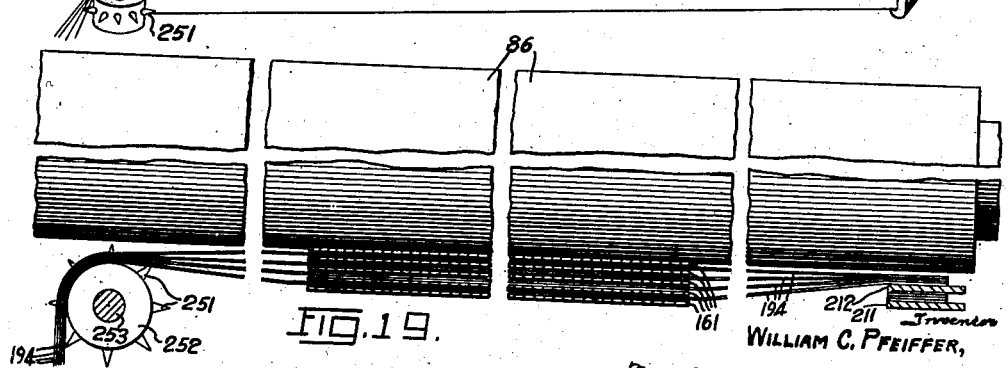

Oct. 13, 1942.   W. C. PFEIFFER   2,298,410
MANIFOLDING MACHINE
Filed Feb. 23, 1939   21 Sheets-Sheet 9
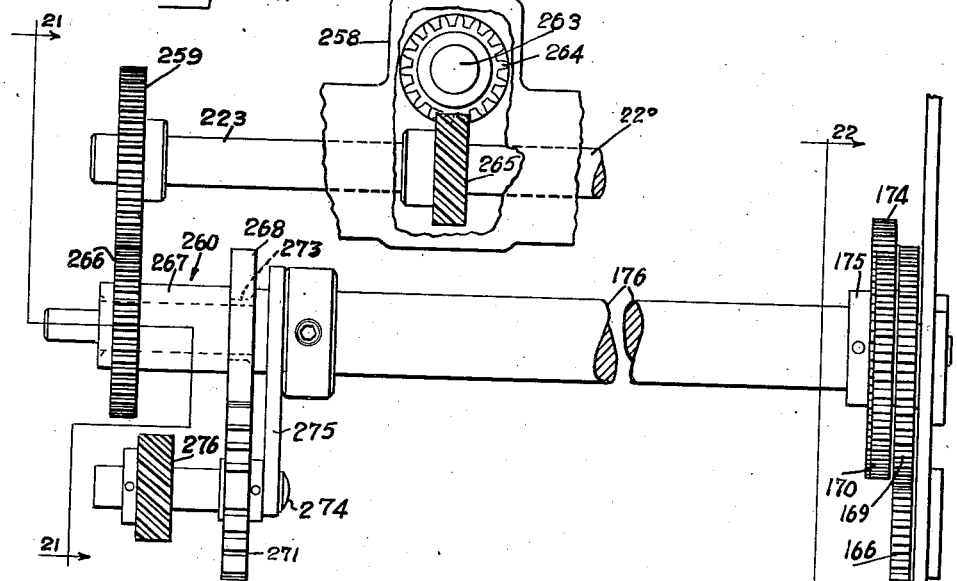
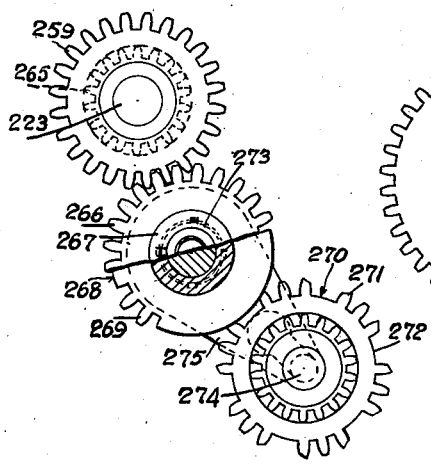
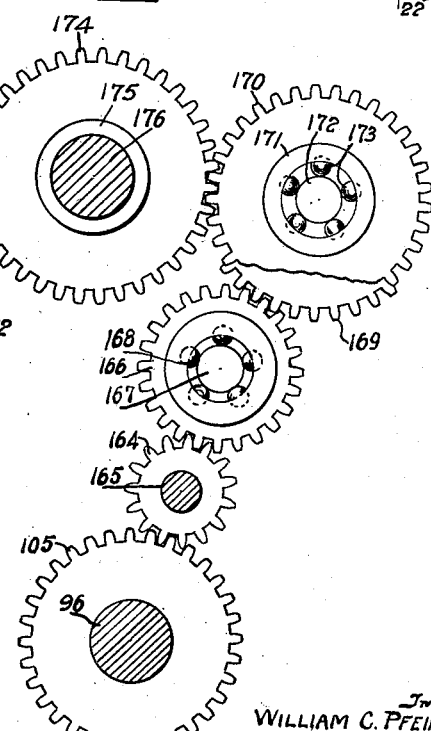
Inventor
WILLIAM C. PFEIFFER,
Toulmin & Toulmin
Attorneys Oct. 13, 1942.  W. C. PFEIFFER  2,298,410
MANIFOLDING MACHINE
Filed Feb. 23, 1939  21 Sheets-Sheet 10
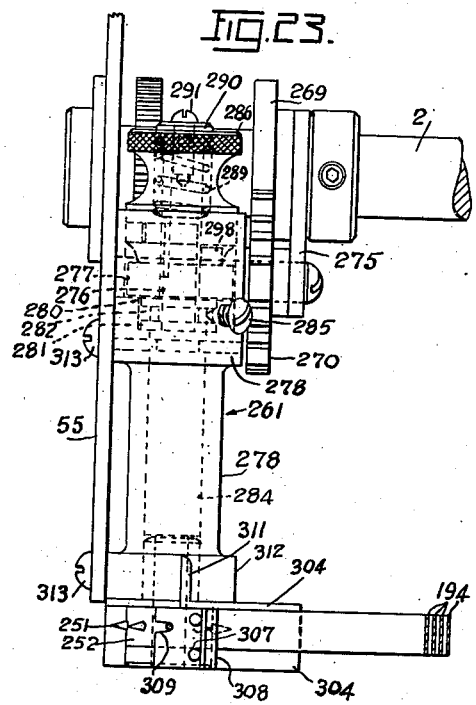
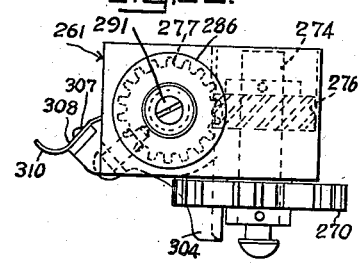
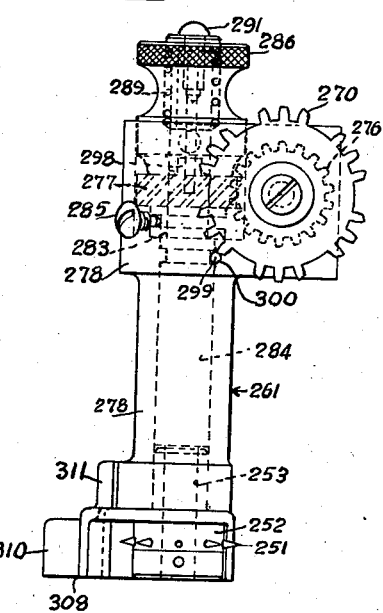
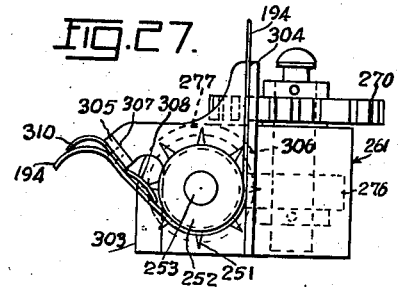
Inventor
WILLIAM C. PFEIFFER,
Toulmin & Toulmin
Attorneys

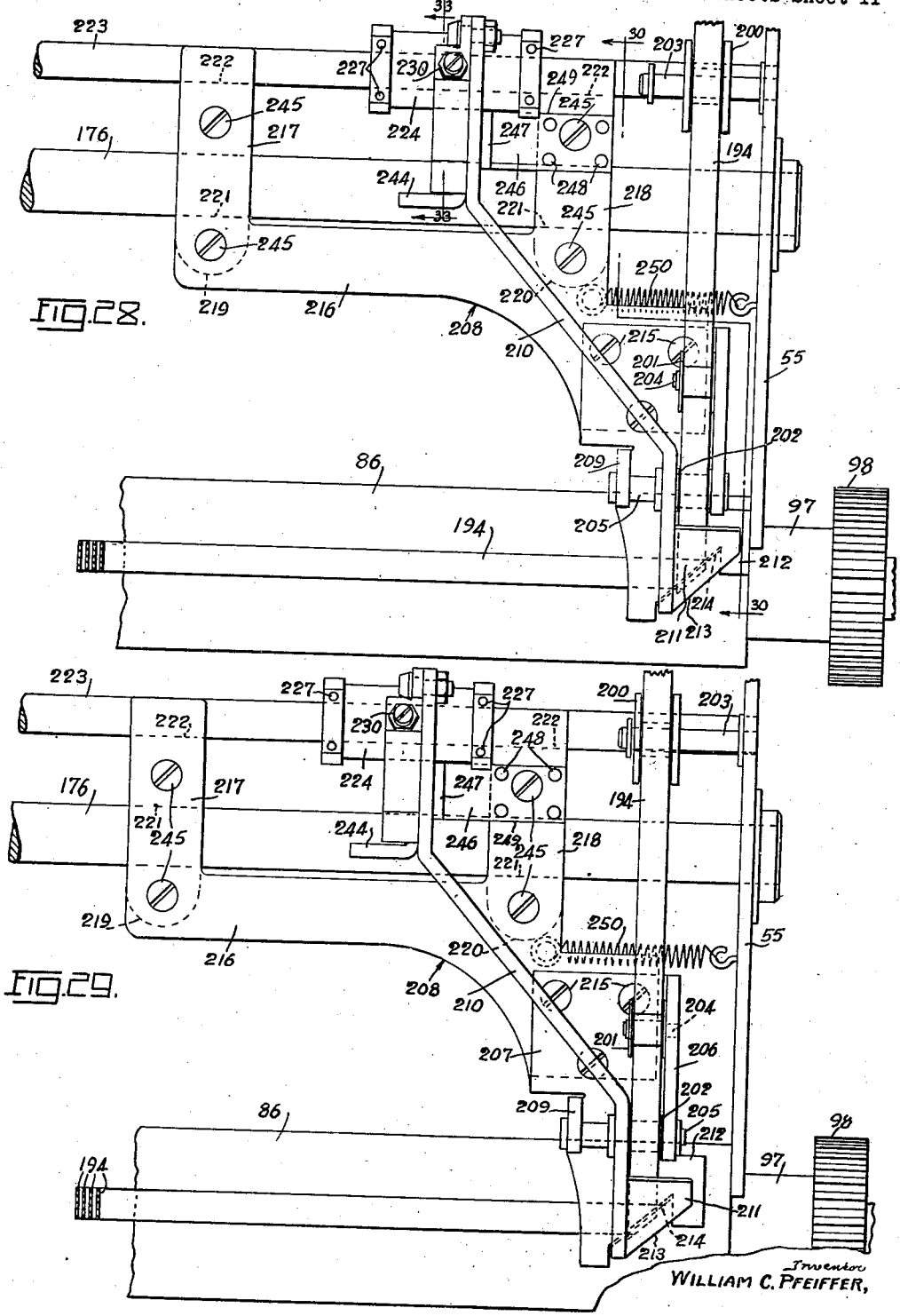

Oct. 13, 1942.  W. C. PFEIFFER  2,298,410
MANIFOLDING MACHINE
Filed Feb. 23, 1939  21 Sheets-Sheet 12
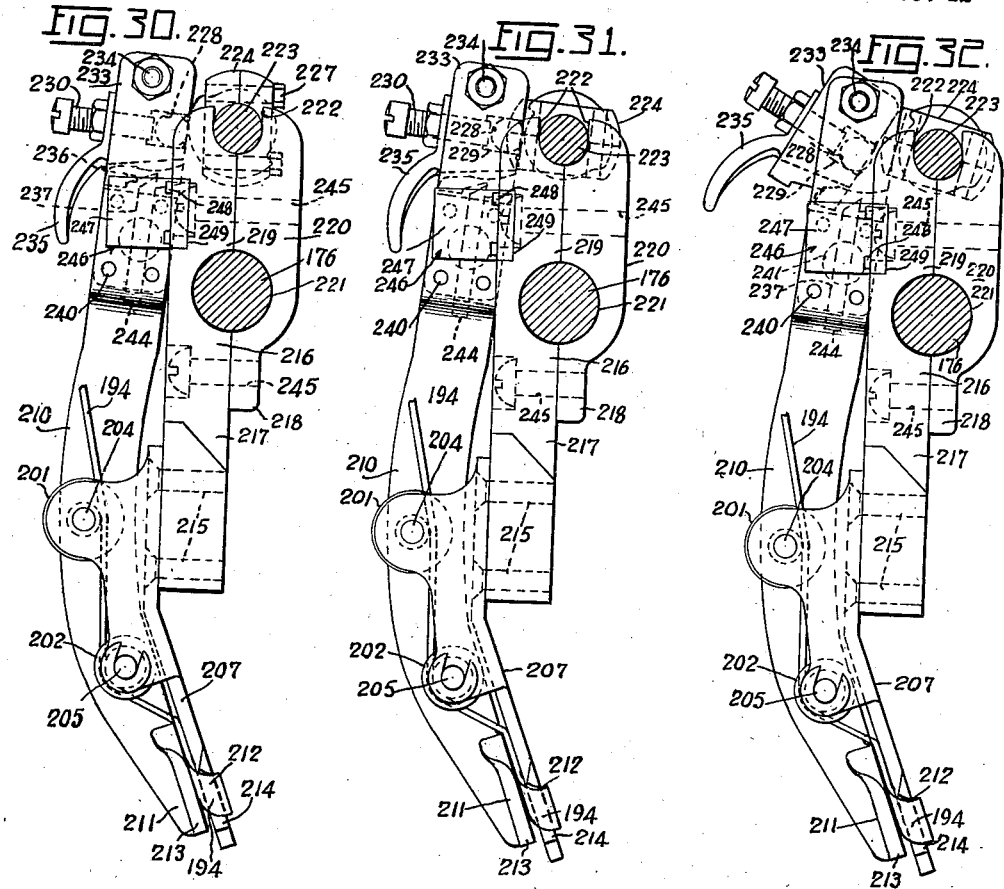
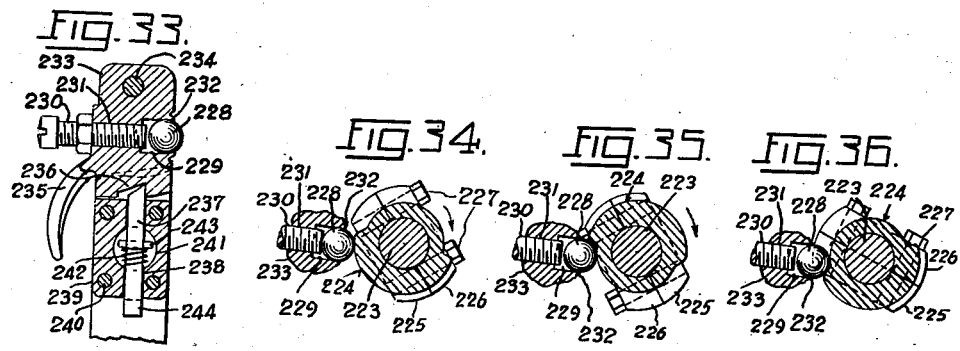
WILLIAM C. PFEIFFER, *Inventor*
Toulmin & Toulmin
*Attorneys*

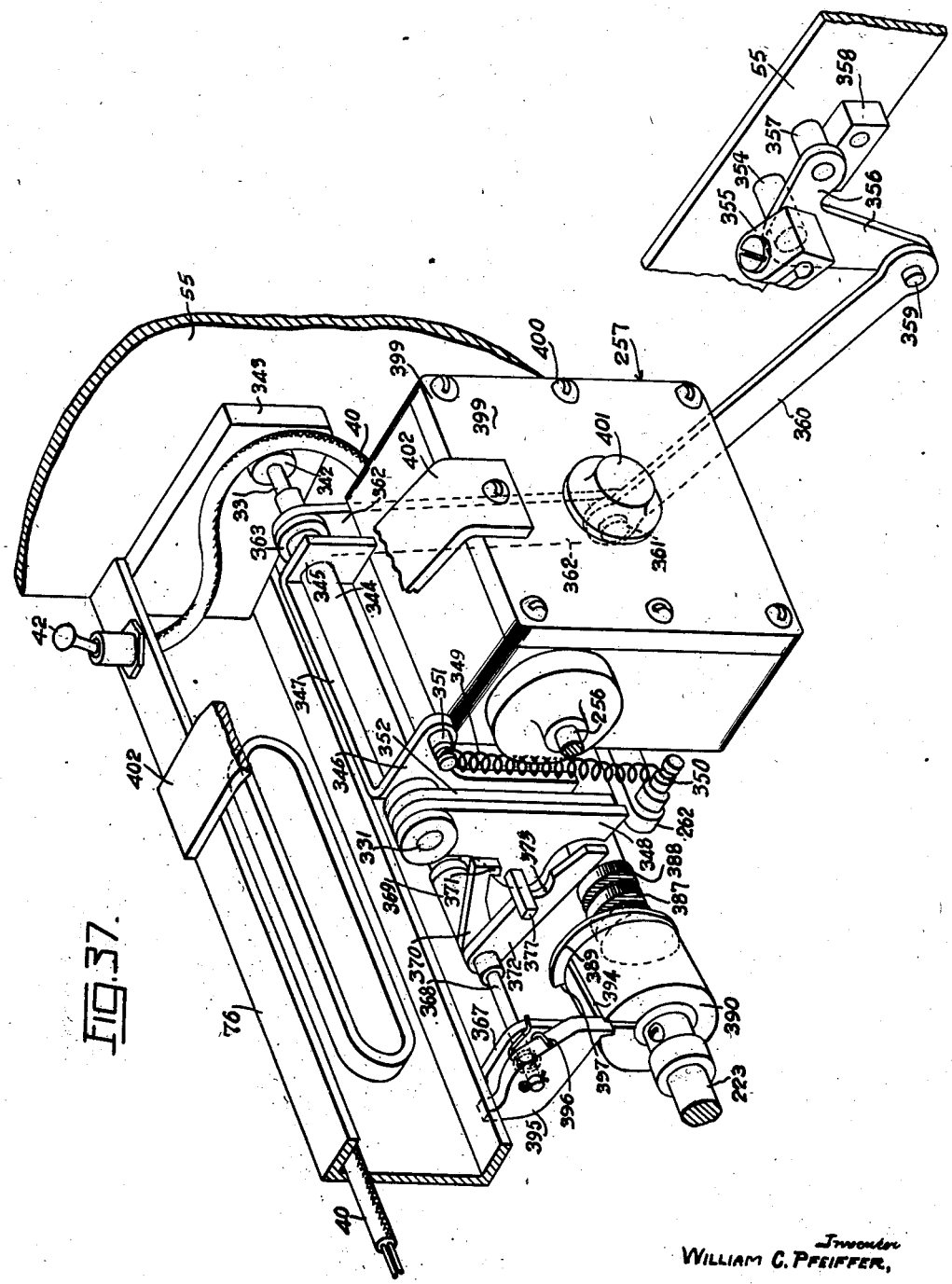

Oct. 13, 1942.  W. C. PFEIFFER  2,298,410
MANIFOLDING MACHINE
Filed Feb. 23, 1939    21 Sheets-Sheet 14
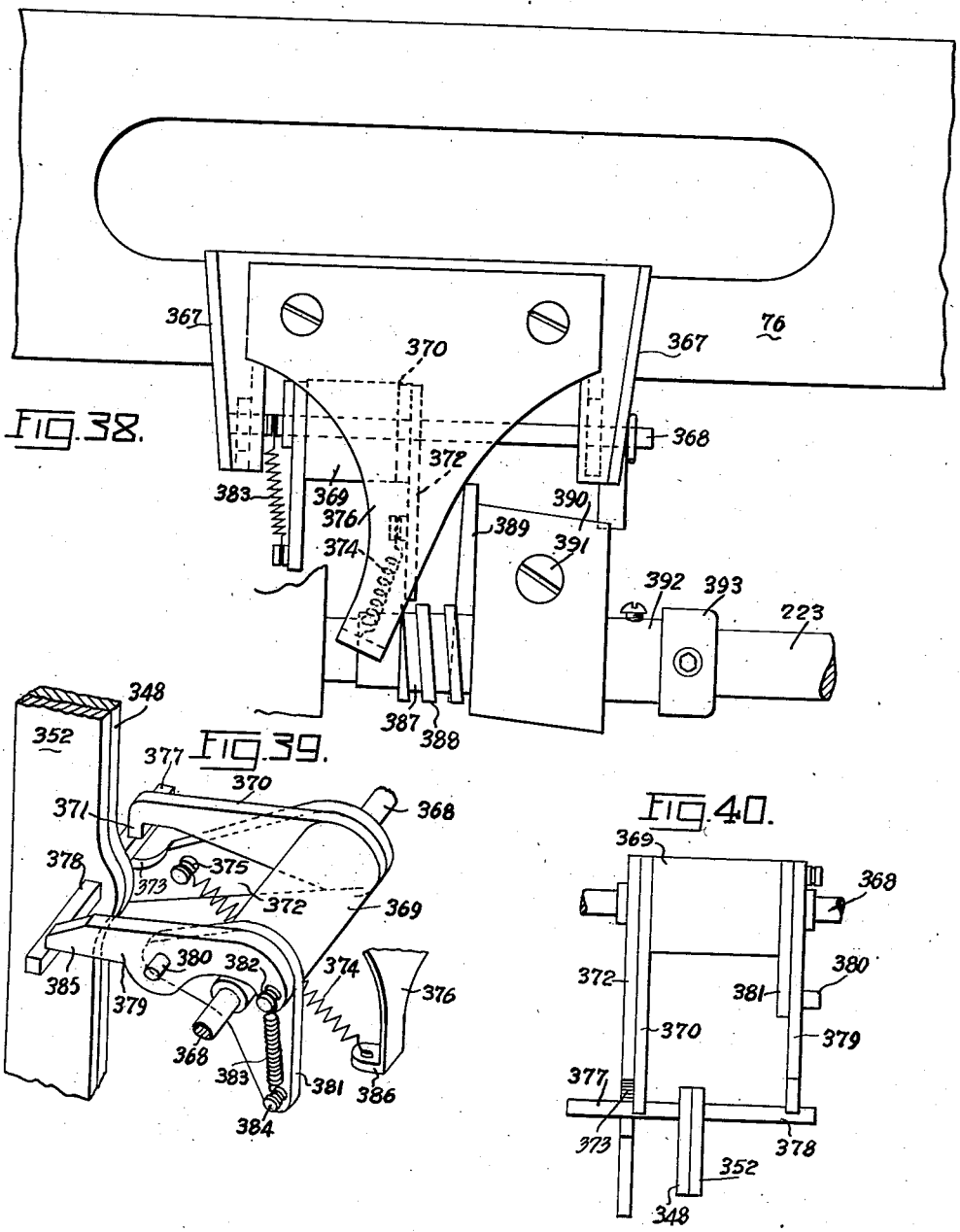
WILLIAM C. PFEIFFER, Inventor
Toulmin & Toulmin
Attorneys Oct. 13, 1942.     W. C. PFEIFFER     2,298,410
MANIFOLDING MACHINE
Filed Feb. 23, 1939     21 Sheets-Sheet 15
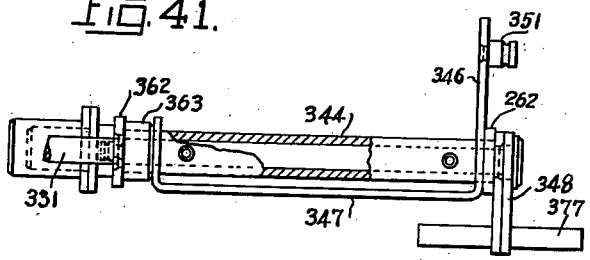
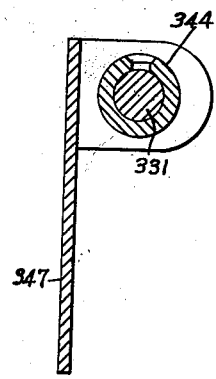
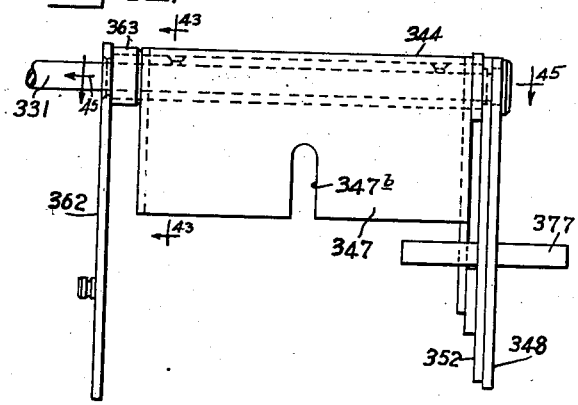
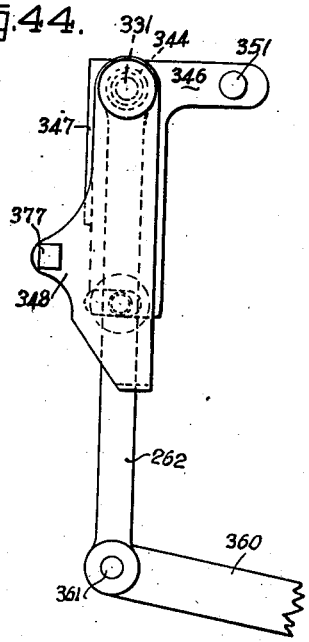
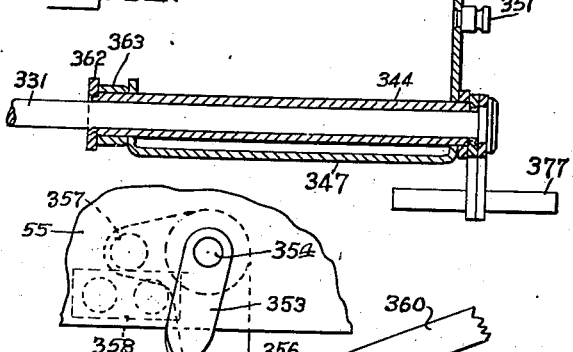
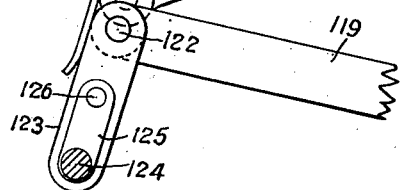
WILLIAM C. PFEIFFER, Inventor
Toulmin & Toulmin
Attorneys

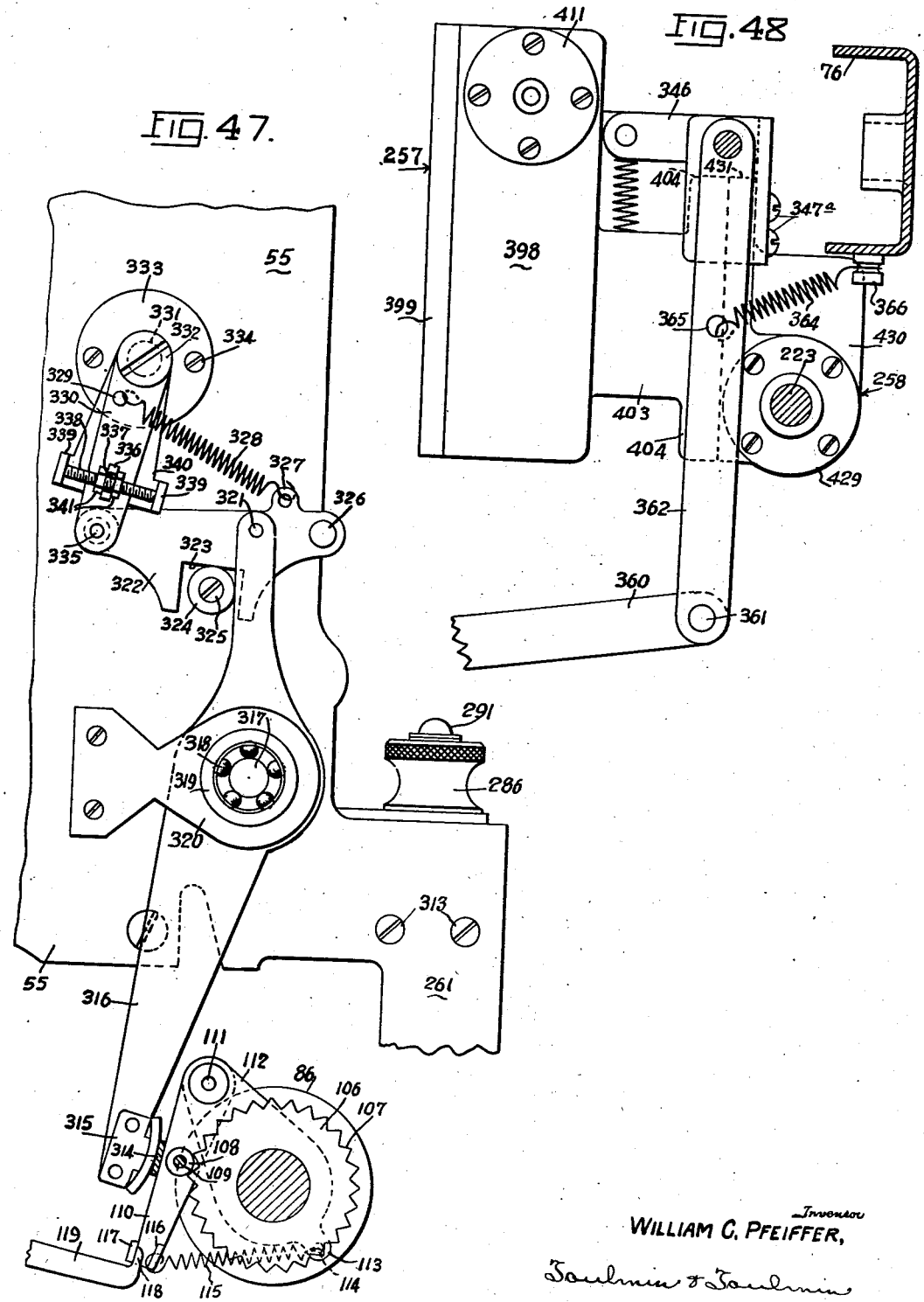

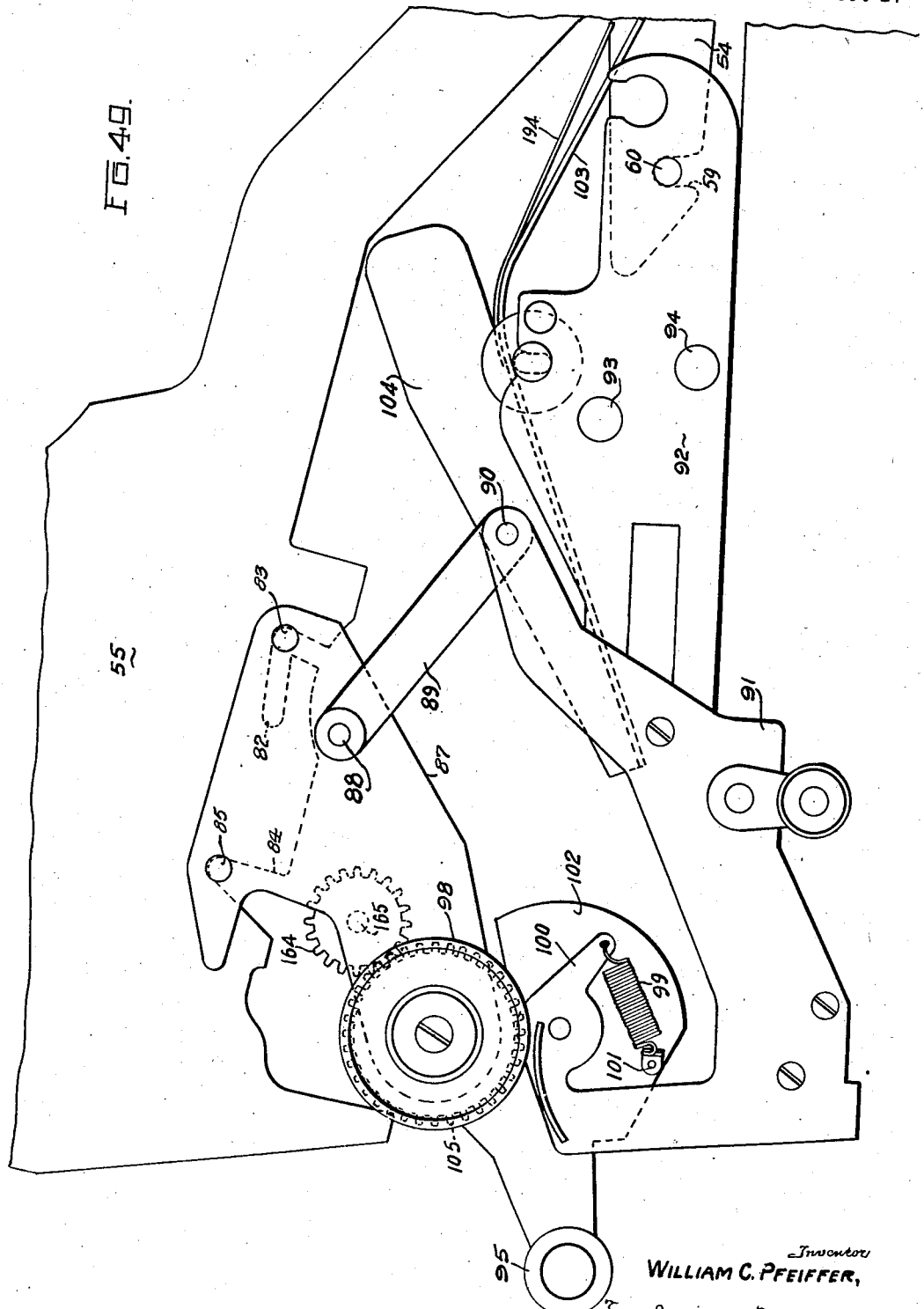

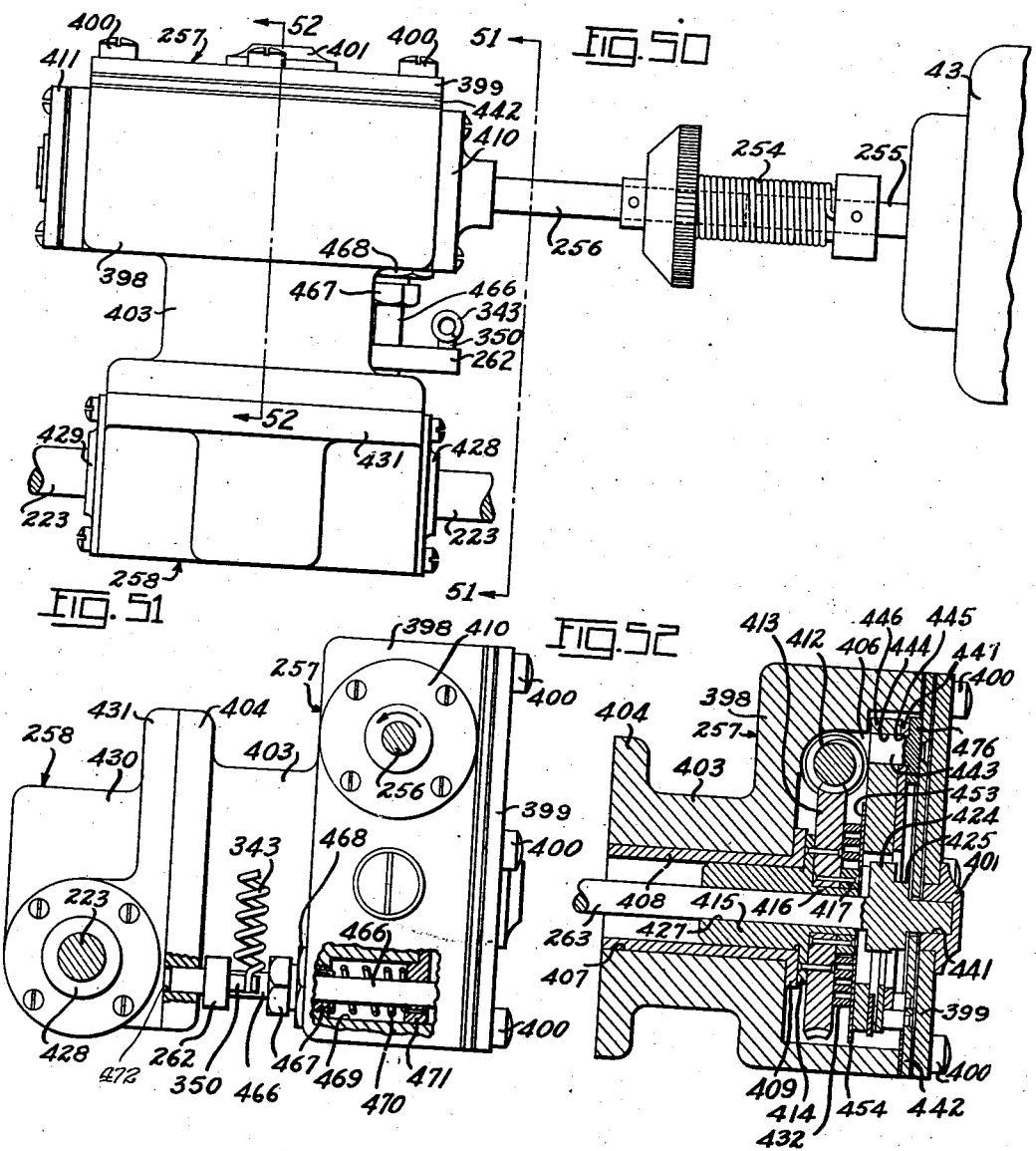

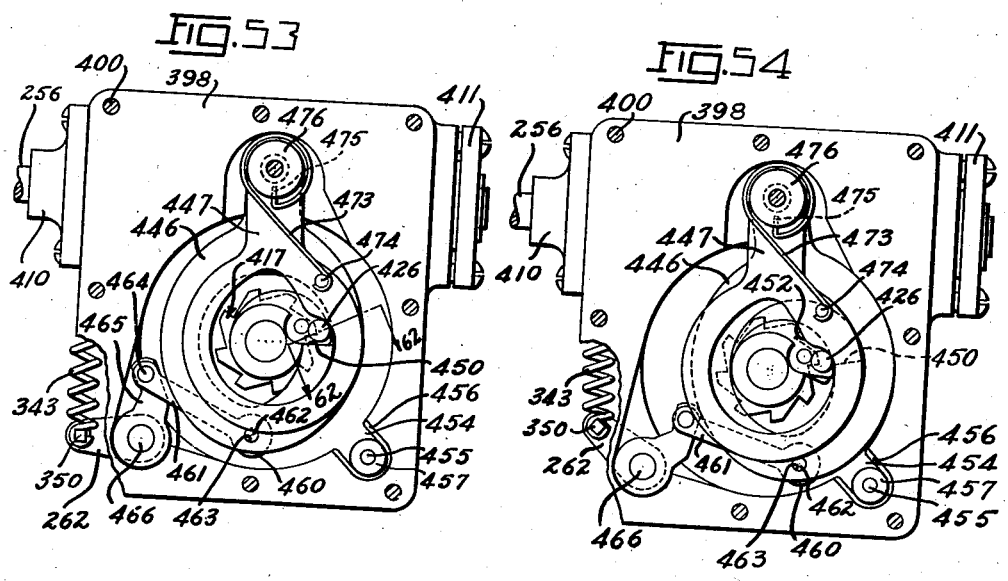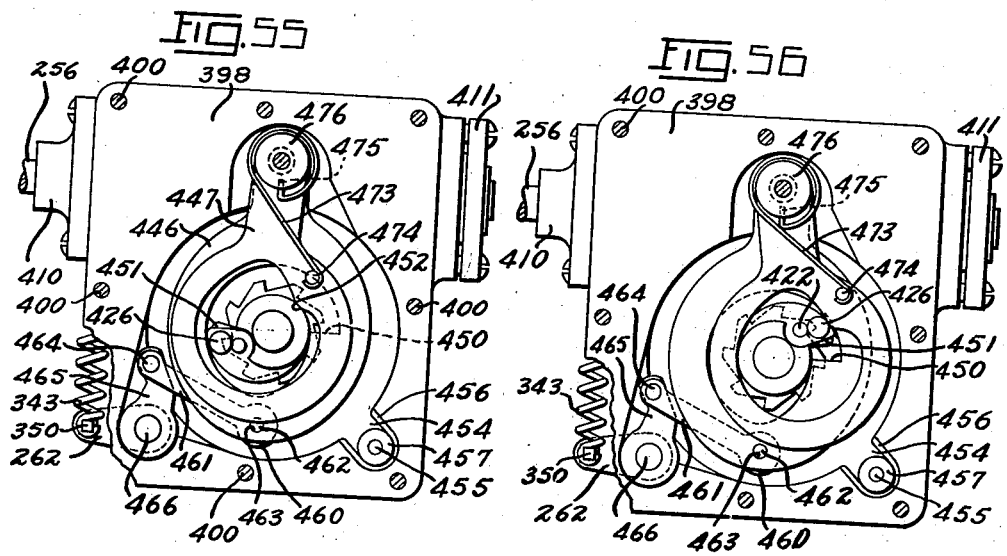

Oct. 13, 1942.　　W. C. PFEIFFER　　2,298,410
MANIFOLDING MACHINE
Filed Feb. 23, 1939　　21 Sheets-Sheet 20

INVENTOR
WILLIAM C. PFIEFFER
BY
ATTORNEYS

Oct. 13, 1942.

W. C. PFEIFFER 2,298,410

MANIFOLDING MACHINE

Filed Feb. 23, 1939

INVENTOR
WILLIAM C. PFIEFFER
BY
Toulmin & Toulmin
ATTORNEYS

Patented Oct. 13, 1942

2,298,410

UNITED STATES PATENT OFFICE 2,298,410

MANIFOLDING MACHINE

William C. Pfeiffer, Dayton, Ohio, assignor to The Egry Register Company, Dayton, Ohio, a corporation of Ohio Application February 23, 1939, Serial No. 258,014

37 Claims. (Cl. 197—126)

This invention relates to manifolding machines, and in particular, to such machines adapted to make multiple copies of documents by means of copying ribbons or carbons, particularly those machines used in connection with typing, adding or tabulating machines, and the like.

One object of this invention is to provide a manifolding machine suitable for attachment to a typing or printing machine, and arranged to swing into and out of operating position without disturbing the arrangement of the supporting portion of the machine.

Another object is to provide a manifolding machine having a supporting frame with one portion telescoping relative to another portion so as to render the frame extensible or contractable at will.

Another object is to provide a manifolding machine adapted to be attached to a typing or printing machine, such as a tabulating and listing machine, means being provided to take the weight of the manifolding machine substantially off the portion of the printing or typing machine upon which the manifolding machine rests.

Another object is to provide a manifolding machine adapted to move a plurality of paper webs past the typing or printing position of the typing or printing machine to which it is attached, the paper webs being forcibly moved by means driven from the platen-operating mechanism of the main typing or printing machine.

Another object is to provide a manifolding machine adapted to move a paper web past the printing position of the main typing or printing machine to which the manifolding machine is attached, the latter being provided with a plurality of "one-time" copying ribbons, such as carbon paper ribbons adapted to be employed for a single impression only, means being provided for feeding these ribbons past the typing or printing position during the line spacing operation of the main typing or printing machine.

Another object is to provide a manifolding machine, as set forth in the preceding object wherein the feeding of the ribbons is effected intermittently by a jerking motion so as to free the ribbons from their natural adhesion to the paper webs as the latter are moved upward during the line spacing operations.

Another object is to provide a manifolding machine, as set forth in the two preceding objects, wherein the copying ribbons are fed by a pin wheel or similar feeding device operated in synchronism with the line spacing mechanism of the main printing or typing machine.

Another object is to provide a manifolding machine, wherein "one-time" copying ribbons are dispensed from containers in which the ribbon spools are loosely mounted, the copying ribbons being automatically crimped or seamed transversely during the ribbon-feeding operations, whereby to reduce the tendency of the ribbons to curl as they pass through the machine.

Another object is to provide a manifolding machine, as set forth in the preceding object, wherein the seaming of the ribbons is brought about by intermittently jerking the ribbons as they emerge from their compartments around a straight edge, such as the edge of the outlet of the container in which the ribbon spools are mounted.

Another object is to provide a manifolding machine employing copying ribbons passing around a yieldingly movable carriage while on their way to the ribbon-feeding mechanism, the latter being arranged to advance the copying ribbons by pulling upon them and at the same time moving the ribbon carriage, the carriage being adapted on its return stroke to pull out an additional length of copying ribbon from the copying ribbon compartment.

Another object is to provide a manifolding machine employing copying ribbons, as set forth in the preceding object, wherein the ribbon carriage is provided with means for automatically gripping the ribbon on the forward stroke of the ribbon carriage and for automatically releasing this grip on the return stroke, thereby advancing the ribbons on the forward stroke of the ribbon carriage and withdrawing additional portions of the ribbons from their spools during the return stroke of the ribbon carriage.

Another object is to provide a manifolding machine employed in association with a typing or printing machine and adapted to type or print a plurality of copies on multiple webs of interconnected paper forms, the apparatus being arranged in such a manner that the copying ribbons are fed by a single step during line spacing operations, and by a plurality of steps during the ejection motion in passing from the lowest line on one paper form to the starting line upon the next paper form, thereby preventing the copying ribbons from adhering to the paper forms with which they are interleaved.

Another object is to provide a manifolding machine attachable to a main typing or printing machine in such a manner as to move a plurality of paper webs interleaved with "one-time" copying ribbons past the typing or printing position, these copying ribbons being of a cheap material, such as carbon paper, and adapted to be thrown away after a single use, thereby reducing the expense of the large sheets of carbon paper or expensive cloth copying ribbons previously employed.

Another object is to provide a manifolding machine of the type described in the preceding objects, wherein the paper webs are in zigzag folded pack form, means being provided for feeding the paper webs from one pack, past the printing position, and depositing them in another pack after the typing or printing has been completed.

Another object is to provide a manifolding machine employing multiple paper webs, wherein a paper-advancing member enters apertures in the webs and simultaneously aligns and moves the webs past the typing or printing position, means being likewise provided for maintaining the paper forms in engagement with the paper-advancing member while permitting the inspection of the typing or printing upon the paper, such means, for example, consisting of a frame yieldingly movable into and out of engagement with the paper.

Another object is to provide a manifolding machine, wherein "one-time" copying ribbons are interleaved between the paper webs in a direction transverse to the direction of motion of the paper webs, positive feeding means, such as a mechanically driven pin wheel, being provided for feeding the copying ribbons, an additional positive feeding means, such as pins upon chains, being provided and positively driven by mechanism synchronized with the printing mechanism of the machine to which the device is attached.

Another object is to provide a manifolding machine, as set forth in the preceding object, wherein the copying ribbons are fed during the interval between printing or typing operations, and preferably during the line spacing motion of the paper webs.

Another object is to provide a manifolding machine having a frame with feeding mechanism for a plurality of paper webs, together with feeding mechanism for feeding copying ribbons interleaved between the webs, yielding means, such as a yieldingly urged ribbon carriage, being provided for imparting a desired tension to the copying ribbons to prevent their sagging or looping during the printing or line spacing operations.

Another object is to provide a manifolding machine, as set forth in the preceding object, wherein means is provided to change the direction of motion of the ribbon, such as at right angles to its previous direction, a yieldingly urged ribbon carriage being interposed to bring about the directional change as well as to assist in the feeding and tensioning of the copying ribbons.

Another object is to provide a manifolding machine for use with a typing or printing machine having means for line spacing the paper forms as well as for moving them a plurality of lines, in order to pass from one form to another, mechanism including a motor and clutch being provided to move the copying ribbons by a single step between typing operations and to automatically move the ribbons a plurality of steps between ejecting operations, or in moving from one paper form to another.

Another object is to provide a manifolding machine, as set forth in the preceding object, wherein the clutch is automatically operative to apply the power of the motor to move the ribbons a single step or a plurality of steps of definite length, and then to automatically disconnect the power after a definite predetermined motion has been obtained.

In the drawings:

Figure 1 is a side elevation of the manifolding machine of this invention in operative or typing position, including the rotary platen and certain of the adjacent mechanism of the main typing or printing machine with which the manifolding machine is associated.

Figure 2 is an enlarged detail section along the line 2—2 in Figure 1, showing the pivot construction around which the manifolding machine swings into and out of operative position.

Figure 3 is a side elevation, similar to Figure 1, but with a portion of the manifolding machine folded back into its inoperative position.

Figure 4 is a front elevation of the manifolding machine shown in Figures 1 to 3.

Figure 5 is a top plan view thereof, with the extensible frame in its retracted and latched position.

Figure 6 is an enlarged top plan view of the rearward portion of Figure 5, showing the extensible frame in its extended position.

Figure 7 is a vertical section along the line 7—7 in Figure 6.

Figure 8 is a vertical section along the line 8—8 in Figure 5, showing the latching device for latching the extensible frame in its retracted position.

Figure 9 is a vertical cross section along the line 9—9 in Figure 1.

Figure 10 is a vertical section through the forward portion of the machine along the line 10—10 in Figure 4.

Figure 11 is an enlarged detail view of the pivot structure in Figure 10, with the forward portion of the machine folded back in the position of Figure 3 looking in the direction of the arrows 11—11 in Figure 5.

Figure 12 is a section along the line 12—12 in Figure 4, showing the top portion of the machine with the paper-guiding structure in its guiding position.

Figure 13 is a view similar to Figure 12, but with the paper-guiding structure swung partly forward out of engagement with the paper webs.

Figure 14 is a view similar to Figures 12 and 13, but with the paper-guiding structure swung completely over the top of the machine into an inverted position.

Figure 15 is a view similar to Figures 12, 13 and 14, but with the paper-guiding structure unlatched and removed from its pivot shaft preparatory to its being completely detached.

Figure 16 is a horizontal section through the copying ribbon container, taken along the line 16—16 in Figure 18.

Figure 17 is a vertical section through the ribbon container, taken along the line 17—17 in Figure 16.

Figure 18 is a diagrammatic perspective view of the ribbon-dispensing apparatus, showing the crinkled condition of the copying ribbons as they emerge from the ribbon container.

Figure 19 is a diagrammatic plan view, partly in section, showing the courses of the copying ribbons and paper webs past the platen of the main typing or printing machine.

Figure 20 is a diagrammatic front elevation of the sprocket chain driving mechanism from the main platen, and also of the intermittent ribbon-feeding mechanism driven from the motor and clutch of the manifolding machine.

Figure 21 is a side view, partly in section, taken along the line 21—21 in Figure 20, and showing the mutilated gear mechanism for intermittently feeding the copying ribbons.

Figure 22 is a side view, partly in section, taken along the line 22—22 in Figure 20, and showing the gearing for driving the paper-feeding sprocket chain shaft from the main platen of the machine to which the manifolding machine is attached.

Figure 23 is an enlarged front elevation of the copying ribbon feeding mechanism shown at the lower left-hand corner of Figure 4.

Figure 24 is a vertical section through the copying ribbon feeding mechanism of Figure 23, with the driving shaft omitted.

Figure 25 is a top plan view of the mechanism shown in Figure 24.

Figure 26 is a right-hand end elevation of the copying ribbon feeding mechanism shown in Figures 24 and 25.

Figure 27 is a bottom plan view of the copying ribbon feeding mechanism shown in Figures 23 to 26.

Figure 28 is an enlarged front elevation of the copying ribbon carriage shown at the lower right-hand corner of Figure 4, and arranged in its advanced position.

Figure 29 is a view similar to Figure 28, but showing the copying ribbon carriage in its retracted position.

Figure 30 is a right-hand end elevation of the copying ribbon carriage, taken along the line 30—30 in Figure 28, with the ribbon-gripping jaws closed.

Figure 31 is a view similar to Figure 30, but with the ribbon-gripping jaws opened automatically by the operating cam.

Figure 32 is a view similar to Figure 31, but with the ribbon-gripping jaws opened manually.

Figure 33 is a fragmentary vertical section through the manual opening mechanism for the ribbon-gripping jaws shown in Figure 32, taken along the line 33—33 in Figure 28.

Figure 34 is a fragmentary vertical section taken in the same plane as Figure 33, and showing the operating cam in position to close the ribbon-gripping jaws, as in Figure 30.

Figure 35 is a view similar to Figure 34, and showing the operating cam in position to automatically open the ribbon-gripping jaws, as in Figure 31.

Figure 36 is a view similar to Figures 34 and 35, but with the parts in position at the instant immediately prior to the ribbon-gripping jaw-closing position shown in Figure 34.

Figure 37 is a perspective view of the ribbon feeding clutch and associated mechanism, looking from above and to the rear of the clutch shown at the left-hand side of Figure 4.

Figure 38 is an enlarged detail front elevation of the clutch-tripping mechanism for the copying ribbon feed as shown at the left-hand side of Figure 4.

Figure 39 is a diagrammatic perspective view of the latching mechanism for the tripping fingers in the copying ribbon clutch mechanism shown in Figure 37.

Figure 40 is a top plan view of the mechanism shown in Figure 39.

Figure 41 is a top plan view, partly in section, of the clutch-tripping finger and shaft mechanism shown near the top of Figure 37.

Figure 42 is a front elevation of the mechanism shown in Figure 41.

Figure 43 is a vertical cross section taken along the line 43—43 in Figure 42.

Figure 44 is a right-hand end elevation of the mechanism shown in Figure 42.

Figure 45 is a horizontal section taken along the line 45—45 in Figure 42.

Figure 46 is an enlarged detail side elevation of the ejector control take-off device for the copying ribbon clutch-tripping mechanism, shown in the lower right-hand portion of Figure 1.

Figure 47 is an enlarged detail side elevation of the line spacing control take-off device for the copying ribbon clutch-tripping mechanism shown in the lower right-hand corner of Figure 1.

Figure 48 is an enlarged detail vertical section, taken along the line 48—48 in Figure 5, and constituting a continuation of the mechanism shown in Figure 46.

Figure 49 is a right-hand side elevation of the main typing machine platen and its supporting mechanism, the platen only being indicated in the extreme lower right-hand corner of Figure 4.

Figure 50 is an enlarged top plan view of the motor and clutch assembly shown at the right-hand side of Figure 5.

Figure 51 is a vertical section along the line 51—51 in Figure 50, showing the input and output shafts of the clutch mechanism, together with the clutch-tripping arm thereof.

Figure 52 is a vertical section through the clutch mechanism of Figure 50, taken approximately along the line 52—52 thereof.

Figure 53 is a rear elevation of the clutch shown in Figures 50 to 52, with the cover plate removed and with the parts in the "at rest" or idling position, wherein the clutch output shaft is motionless.

Figure 54 is a view similar to Figure 53, but with the parts in the position occupied at the instant that the clutch-tripping arm is actuated.

Figure 55 is a view similar to Figures 53 and 54, but with the parts in the position to return the clutch-tripping arm to its original position during the operation of the clutch.

Figure 56 is a view similar to Figures 53, 54 and 55, but with the parts in the position occupied just prior to the completion of a single revolution of the output shaft of the clutch.

Figure 64 is a fragmentary perspective view of the upper pan which receives the typed records, and particularly showing one of many ways that the pan can be secured to the frame of the machine.

General arrangement

Figure 57:
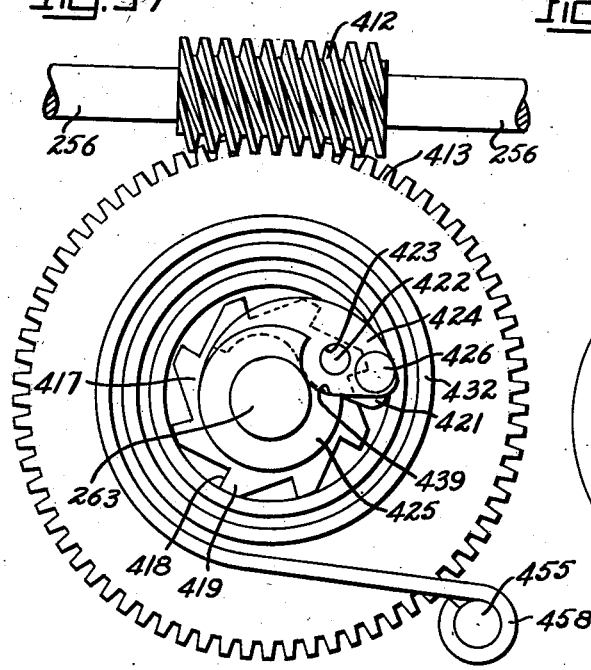
Figure 57 is an elevational view of the worm and worm wheel within the clutch, together with the clutch, ratchet and cam.

In general, the manifolding machine of this invention, as shown in assembly in Figures 1, 4 and 5, is an attachment to be used in conjunction with a main machine adapted to type or print a record, such as a tabulating and listing machine, typewriting machine or adding machine. The main machine ordinarily is provided with its own printing mechanism, including type and a ribbon, together with means for printing a single copy of a record or multiple copies with the use of sheets of carbon paper interleaved between the multiple paper sheets or webs.

Hitherto, such carbon sheets were moved with the paper sheets and interfered with the alignment of the paper sheets, as well as requiring readjustment to bring them into alignment with untyped portions of the paper webs after portions thereof had been typed and the subsequent portions to be typed fell outside the boundaries of the carbon sheets. In the manifolding machine of the present invention, however, the multiple copies of the records are made upon multiple paper webs interleaved with "one-time" copying ribbons between the multiple paper webs and traveling in a direction perpendicular to the direction of motion of the sheets or webs. In this manner necessity for the use of carbon sheets is eliminated, together with the difficulties of realigning the carbon sheets when subsequent paper webs to be typed fall outside the boundaries of the carbon sheets.

Furthermore, the copying ribbons employed in the present invention are made of a cheap material and can be used one time and then discarded. A short strip of the copying ribbon, which may consist of a carbon paper ribbon, is equivalent to an entire sheet of the carbon paper hitherto employed. This carbon paper ribbon is also relatively inexpensive as compared with the cloth copying ribbons hitherto employed. As the carbon paper copying ribbons are used but once in the present invention, the intricate mechanism for reversing the feed of the ribbons, as required in using the expensive cloth copying ribbons, is eliminated.

In the manifolding machine of the present invention, the carbon paper ribbons are automatically fed by predetermined steps between the typing operations of successive lines of type, so that this motion of the ribbons breaks up their natural tendency to adhere to the paper forms with which they are interleaved. This ribbon feeding is synchronized with the line spacing mechanism of the main machine to which the manifolding machine of the present invention is attached, and is controlled in accordance with the motion of certain of the line spacing parts of the main machine. Furthermore, certain of such main machines, such as tabulating and listing machines, are equipped with mechanisms for automatic ejection spacing of the paper forms; that is, for moving the paper webs a multiplicity of line spacings between successive forms in order to pass from the typing position, at the bottom of one form, to the typing position, at the top of the next form. The ribbon-feeding mechanism of the present invention takes cognizance of this ejection spacing mechanism by being arranged to feed the ribbons a plurality of steps during the ejection spacing operation, but to feed the ribbons a single step during the single line spacing operation. The ribbon-feeding mechanism is controlled in response to the motion of the line spacing toothed wheel and roller detent on the platen of the main machine (Figures 1, 46 and 47). In order to eliminate the natural tendency of the carbon paper ribbons to curl during their passage through the manifolding machine of the present invention, means is provided whereby the ribbons are crimped or seamed transversely at intervals as they emerge from the ribbon containers, these transverse seams tending to reduce the curling of the ribbons.

The ribbons are led from their containers to a laterally reciprocable ribbon carriage (Figure 4), where they change their directions at right angles and proceed along the main platen past the paper webs with which they are interleaved, to a positively driven ribbon-feeding pin wheel at the opposite end of the platen from the ribbon carriage. The ribbon-feeding pin wheel is driven by an independent motor through a clutch, the openings and closings of which are synchronized with the line spacing and ejection spacing operations of the main machine, as previously mentioned. Thus, the ribbon-feeding pin wheel rotates further for an ejection spacing than for a line spacing operation, pulling a predetermined length of copying ribbon along the main platen each time it operates. The ribbon carriage is provided with automatically operated clamping jaws at the point where the ribbons change their directions through a right angle. The ribbon-clamping jaws of the carriage are clamped and unclamped by a cam synchronized with the ribbon-feeding mechanism so that the ribbon is clamped in the jaws of the carriage during the rotation of the ribbon-feeding pin wheel, thereby causing the ribbon carriage to be pulled to the left (Figure 4). When the pin wheel stops rotating, after the ribbon feeding operation, the ribbon carriage cam releases the jaws from their clamping engagement with the ribbon, whereupon the carriage is moved back to its starting position under the influence of a spring pushing its way along the now stationary ribbon, the end of which is momentarily anchored by the temporarily stationary pin wheel. By reason of this action more ribbon is pulled out of the ribbon containers during the return stroke of the ribbon carriage, and also the ribbon-feeding pin wheel is inoperative.

The paper webs of the manifolding machine of the present invention are moved through the machine by means of pins attached to endless sprocket chains, these pins entering apertures in the paper webs. Thus, the pins serve not only to advance the paper webs but also to align them, a factor of great importance when printed matter is previously provided upon the successive forms into which the paper webs are divided. The sprocket chains carrying the pins for advancing and aligning the paper webs are driven by sprockets, which in turn, are driven through gearing from a gear mounted on the rotary platen of the main machine to which the manifolding machine of the present invention is attached.

The paper webs are guided and urged against the sprocket chain pins by a paper guide frame or "bale," pivotally mounted on an upper cross member of the machine frame (Figure 4). The paper guide frame may be swung outwardly about its pivot in order to thread the paper webs through the machine (Figures 12 to 14), or it may be unhooked from its pivot rod and removed entirely (Figure 15).

*Supporting structure of machine*

The supporting structure of the manifolding machine of this invention is shown chiefly in Figures 1 to 10 and 49. The machine as a whole (Figure 3) is supported upon a framework consisting of legs 10 (Figure 3) interconnected by cross members 11. The forward legs 10 (Figure 9) are riveted at their tops 12 to a U-shaped frame member 13 having cap screws 14 operating in vertical slots 15 of triangular brackets 16. Secured to the upper portions of the latter are circular sockets 17 (Figures 9 and 11) having circular recesses 18 therein for the reception of correspondingly circular bearing members 19, this structure forming trunnions for pivotally supporting the upper part of the machine. The circular members 19 are provided with diametrical grooves 20, within which are secured the channel guide members 21 (Figure 9), the latter in turn slidably receiving the side frame members 22, in the form of bars.

The triangular brackets 16 (Figures 1 and 3) are interconnected at their forward ends by the cross member 23, carrying threaded studs 24 upon which are mounted the adjustable stops 25 having heads 26 (Figures 1 and 5) for engagement with the main machine. The rearward ends of the channel guide members 21 are interconnected by a cross rod 27, which is received in vertical slots 28 in the upper ends of a U-shaped frame member 29 similar to the frame member 13 and similarly interconnecting the tops of the rear legs 10. The outer ends of the cross rod 27 are threaded, and carry a pair of threaded collars 30 and 31 and a spacing washer 32 (Figures 5 and 6).

Pivotally mounted on the cross rod 27, adjacent one of the collars 30, is a latch 33 having a handle 34 and a notch 35 (Figure 8), adapted to hook over a cross rod 36 interconnecting the rearward ends of the frame side members 22 (Figures 3, 5 and 6). By employing a suitable spanner or wrench the collars 30 and 31 may be tightened against the channel guide members 21 so as to clamp the ends of the latter at any desired position within the vertical grooves 28. Mounted on the sides of the channel guide members 21, at a point intermediate the legs 10 (Figure 3), are the brackets 37 having inwardly extending forward portions 38 (Figures 5, 6 and 7). The bracket portions 38 serve as stops for engaging the cross member 36 and preventing its further withdrawal (Figure 6) when the machine frame is extended by sliding the side members 22 within the channel guide members 21.

The left-hand end of the U-shaped frame member 29 is provided with a bracket 39 (Figures 5 and 6) for supporting an electric cable 40 by which electrical current is conducted to the motor which actuates the ribbon-feeding mechanism. The electric cable 40 is omitted from Figures 3 and 10 in order to avoid concealing the structure behind it. The cable 40 passes through a casing 41 (Figure 5) having associated therewith a switch 42. From the casing 41 the cable 40 continues to the motor 43 by which the ribbon-feeding mechanism is operated. The switch 42 controls the energization and deenergization of the motor 43.

The frame side members 22 are interconnected near their forward ends by the diagonal braces 44 and 45 (Figure 5), these at their midportions being secured to one another, while diverging at their ends. The ends 46 of the braces 45 are provided with apertures 47 for receiving the portion 48 of a pivot bolt 49 (Figure 2), having a locknut 50 on the threaded end 51 thereof. The pivot bolts 49 are also provided with portions 52 and 53, of different diameters, respectively engaging the forwardly extending latches 54 and upper side members 55 at the apertures 56 and 57 therethrough (Figures 1, 2 and 5). The forward ends of the slidable frame side members 22 are also provided with apertures 58 (Figure 2) engaging the reduced diameter portions 48 of the pivot bolts 49. In this manner the latches 54 are pivotally mounted so as to be raised and lowered in such a manner that their latching notches 59 may be engaged with the members 60 mounted on the main machine to which the manifolding machine of the present invention is attached (Figure 10). By raising the latches 54 the notches 59 may be disengaged and the manifolding machine separated from the main machine.

Hooked over the cross rod 36 and depending therefrom is a pan 61 for receiving the unprinted pack of zigzag folded paper forms constituting the paper webs upon which the records are made. The forward end of the pan 61 is bent upwardly, as at 62, and is provided with a horizontal portion 63 resting upon the cross member 23 (Figure 1). Cooperating with the lower pan 61 is an upper pan 64 (Figures 1, 3, 5 and 10) for receiving the paper forms or webs after they have been typed upon, the webs again refolding themselves in zigzag form as they are deposited in the upper pan 64 after emerging from the machine. The upper pan 64, at its rearward end, is provided with pivot brackets 65 mounted on the lower side thereof and carrying pivot portions 66 for the upper ends of bent links 67, the lower ends of which have pivot portions 68 supported by ears 69 mounted on the channel guide members 21 (Figures 1 and 5). In its folded position (Figure 3) the upper pan 64 is supported upon a cross rod 70, which is supported at its ends in the upwardly extending brackets 71 mounted upon the brace 44, which as previously stated, interconnects the sliding frame side members 22.

The forward edge of the upper pan 64 is bent around a rod 72 (Figures 3 and 10), and is cut away at its mid-portion indicated at 72' to permit the rod to be slipped into the notch 73 of a hook portion 74 forming a part of the stationary paper guide 75, secured at its lower end to the frame cross member 76 (Figure 10), upon which the motor 43 is likewise mounted. The upper portion of the stationary paper guide 75 consists of diverging horns 77 (Figure 5) having their upper ends 78 curved outwardly and forwardly. A spring lock member 79 (Figures 10 and 64), with a rounded end indicated at 80 is secured to the hook portion 74 to releasably hold the rod 72 in the notch 73. The upper frame side members 55 are provided with studs 81 (Figures 1, 3, 10 and 11), which serve as stops in the folded position of Figure 3, and in the operating position of Figures 1 and 10. The upper frame side members are roughly L-shaped, and on their lower edges are provided with L-shaped slots 82 adapted to hook over the members 83 forming a part of the main machine to which the present manifolding machine is attached. Additional notches 84 (Figures 1 and 10) in the side members 55 serve to hook over the members 85 forming a part of the main machine. In this manner the side members 55 and the mechanism which they carry are brought into accurate alignment with the portions of the main machine with which they cooperate.

Main machine construction

The main machine with which the present invention is employed forms no part of the present invention, and may be a tabulating machine, an adding machine, a tabulating and listing machine, or any other suitable machine capable of printing a record. For purposes of illustration a tabulating and listing machine has been disclosed in the drawings. The mechanism of the main machine is beyond the scope of the present disclosure except as it cooperates with the mechanism of the machine of the present invention, particularly as regards the rotary platen 86 of the main machine.

The rotary platen 86 of the main machine is rotatably mounted in the side plates 87 (Figure 49), which carry the members 83 and 85 previously referred to as engaging the notches 82 and 84, respectively, in the frame side members 55. The side plates 87 are provided with pivots 88 engaged by the upper ends of links 89, the lower ends of which are mounted on pivots 90 carried by U-shaped side plates 91, which in turn, are secured to side plates 92 interconnected by the cross members 93 and 94 (Figures 10 and 49).

One of the side plates 87 in which the platen 86 is journalled is provided with a handle 95 (Figure 49), whereby the platen assembly may be moved upwardly from its normal position resting on the side plates 91. When the handle 95 is pulled the platen assembly moves forward and upward, assisted by the links 89 which swing in a manner to permit this, and the parts come to rest in the position shown in Figure 49. The platen 86 is mounted on a shaft 96 (Figure 4), shown emerging at the left-hand end thereof. At its right-hand end the platen is provided with a reduced diameter shaft portion 97 carrying a knurled hand wheel 98 for the manual rotation of the platen 86 (Figure 4). A coil spring 99, anchored at one end to the projection 100 on the side plate 91 and at its other end to the stud 101 secured to the downwardly extending portion 102 of the side plate 87, urges these parts toward one another.

The platen assembly shown in Figure 49 is provided with a paper guide member 103, arranged horizontally between the opposite sides of the platen and supported by the upwardly bent portions 104 at the sides thereof. The paper guide 103 is bent near the middle thereof so as to provide a curved path for the paper webs in their path between the lower pan 61 (Figure 1) and the platen 86. The platen 86, at its right-hand end, is provided with a gear wheel 105, by which it is automatically rotated by the mechanism of the main machine in order to line space the paper forms being typed or printed. It is from this gear wheel 105 that the drive is taken for feeding the paper in the manifolding machine of the present invention, as hereinafter described in detail.

The left-hand end of the platen is provided with a toothed wheel 106 (Figures 4 and 47), the teeth 107 of which form notches engaged by a detent roller 108 on a pin 109 mounted on a detent arm 110 pivoted on the pin 111, mounted on the bracket 112 (Figure 47). The lower end of the bracket 112 terminates in an ear 113 with a hole 114, to which one end of a coil spring 115 is attached, the opposite end being secured to a projection 116 on the lower end of the detent arm 110. The latter is provided with a second projection 117 adapted to be engaged by the hook 118 on the end of a bar 119 in such a manner that when the bar 119 is pulled to the left (Figure 47) it swings the detent arm 110 and detent roller 108 outwardly from engagement with the toothed wheel 106. On the other hand, when the platen 86 is rotated normally for line spacing, the detent roller 108 and the detent arm 110 are pushed outward without interference with the bar 119 as the roller 108 rides over a tooth 107 and comes to rest in the next valley between adjacent teeth, in the event that a single line spacing has been accomplished.

The bar 119 (Figure 1) is a part of the platen assembly of the main machine and is used to remove the detent roller 108 from engagement with the teeth 107 when it is desired to eject the paper form or move it a plurality of line spaces. In this manner the drag effect of the roller 108 upon the toothed wheel 106 of the platen 86 is temporarily removed. The bar 119 is provided with a guide slot 120 engaging a pin 121, and is connected at its other end by the pivot 122 to the arm 123, mounted on the shaft 124 (Figures 1 and 46). Also mounted on the shaft 124 is an arm 125 having a pin 126 therein for connection to other mechanism within the main machine, and of no importance to the present invention. The arm 123, as will subsequently be described, serves as the take-off point for the control mechanism for actuating the ribbon-feeding mechanism through a plurality of feeding steps, whereas the detent arm 110 serves as the take-off point for the ribbon-feeding control for feeding the ribbon a single step at the time of the normal line spacing operations.

Paper-guiding and feeding mechanism

The L-shaped side frame members 55 are interconnected by the cross member 76 (Figures 4 and 10), secured thereto at its ends 127. Rising from the upper portions of the side members 55 are V-shaped brackets 128 (Figure 1) having slots 129 engaged by screws 130. In this manner the brackets 128 may be raised or lowered by loosening the screws 130. The upper ends of the brackets 128 serve to support a cross shaft 131, upon which the rotatable drums 132 are mounted. These drums 132 serve to guide the paper in its passage over the top of the machine and down into the upper pan 64. The shaft 131 also serves to support the arms 133 (Figures 12 to 15) by which the paper guide frame or bale, generally designated 134, is mounted upon the machine. The ends of the arms 133 are hooked, as at 135, and placed over the cross shaft 131.

A pivoted member 136 is then swung into position, as shown in Figure 15, to cover the open end of the notch 137 in the portions 135. The member 136 is pivoted around the screw 138 and is urged to a notch-closing position by the spring 139 engaging the pin 140 at one end, and coiled around the screw 138 to an anchorage at the other end. A projecting portion 141 has a lip 142 which serves not only for grasping the portion 141 but also as a stop for the member 136 when it is moved outwardly around its pivot to open the notch 137. Arms 143, pivoted around the screws 144 on the V-shaped frame members 128, carry notches 145 in their outer ends, serving as detent notches for the screws 138 when the paper guide frame is swung into the position shown in Figure 13. Coil springs 146, secured at their lower ends to pins 147 in the arms 143 and at their upper ends to pins 148 mounted on the V-shaped frame members 128, urge the arms 143 upwardly (Figure 12).

The arms 133 are interconnected by cross members 149 carrying paper guide rods 150, which are curved at their upper ends to guide the paper webs around the drums 132 (Figures 4 and 12). The cross members 149 are secured to the arms 133 with the aid of the triangular portions 151 (Figure 4). The guide rods 150, mounted on the cross member 149, are eight in number, the two outer pairs being unsupported at their lower ends. The two inner pairs, however, are interconnected by the lower cross member 152 (Figure 4) near their bottom ends. By unlatching the swinging members 136 (Figure 15) the paper guide frame or bale 134 may be unhooked from the shaft 131 and removed from the machine, or it may be swung over the top of the machine and inverted in the position shown in Figure 14 in order to facilitate the threading of the paper webs through the various portions of the machine.

The cross shaft 131 (Figure 10) is additionally supported near the middle thereof by uprights 153, secured as at 154 to the cross member 76 and having slots 155 in its upper end engaged by screws 156 passing into upper extensions 157, through which the cross shaft 131 passes (Figures 5 and 10). The screws 156 and slots 155 permit adjustment of the upper portions 157 up or down relatively to the uprights 153. The midportions of the uprights 153 are provided with ears 158 through which the cross shaft 159 passes, this cross shaft being anchored at its outer ends to the upper ends of the side frame members 55, as by the screws 160 (Figure 1).

When the paper webs 161 are threaded through the machine they pass from the zigzag folded pack within the pan 61, over the paper guide 103 forming a part of the main machine platen assembly (Figure 10), thence around the main platen 86 and up the front of the machine behind the paper guide frame or bale 134, thence over the drums 132 and downwardly over the fixed paper guides 77, into a zigzag folded pack 162 in the upper pan 64. The paper is moved positively through the machine, past the printing or typing position adjacent the front of the main platen 86 by mechanism driven from the gear wheel 105 connected to the main platen 86 (Figure 4).

The main machine is ordinarily provided with gripping rolls of the usual type for forcing the paper webs into frictional engagement with the main platen 86. In using the machine of the present invention, however, the gripping rolls are released by the usual mechanism provided for that purpose, hence, are non-existent as far as the use of the present machine is concerned, and accordingly are omitted from the drawings. Ordinarily, the gripping rolls are relied upon to force the paper webs into driving engagement with the main platen, but the driving and feeding of the paper in the manifolding machine of the present invention are accomplished, as previously stated, by pins on sprocket chains driven from the main platen 86, these pins entering apertures 163 (Figure 4) in the paper webs 161.

For this purpose the gear wheel 105 on the platen shaft 96 (Figures 4 and 22) meshes with an idler pinion 164 upon a shaft 165 (Figures 22 and 49). Meshing with the pinion 164 is an idler gear 166 loosely rotatable around the shaft 167, and journalled thereon by means of the ball bearings 168. Meshing with the gear 166 is a gear 169 having a second gear 170 mounted on its hub 171, the two gears being rotatable around the shaft 172 by means of the ball bearings 173. The gear 170 meshes with a gear 174 having its hub 175 drivingly connected to the sprocket shaft 176, which at its opposite ends is journalled in the side frame members 55.

The sprocket shaft 176 (Figures 4 and 10) carries a pair of sprockets 177 with their teeth engaging endless sprocket chains 178 supported at the top of the machine by the sprockets 179, rotatable around the upper cross shaft 131. The sprocket chains 178 are provided at intervals with pins 180 adapted to enter the apertures 163 in the paper webs 161. Accordingly, when the main platen 86 is rotated by the line spacing mechanism within the main typing or tabulating and listing machine, the motion thereof does not feed the paper webs 161 because the gripping rolls have been removed from engagement therewith. The rotation of the main platen 86, however, is transmitted through the gears 105, 164, 166, 169, 170 and 174 (Figures 20 and 22) to the sprocket shaft 176, causing the pins 180 on the sprocket chains 178 to move upward the distance required for line spacing.

When typing has been completed upon the paper forms 161 and the main platen 86 is rotated a greater amount to eject the form from the typing position and to bring up another form into typing position, the same motion is transmitted to the pins 180 on the sprocket chains 178 by the gear train of Figure 22, and the pins 180 carry the paper webs 161 upwardly a much greater amount than a single line space. In this manner, however, the motion imparted to the main platen 86 by the mechanism within the main machine is faithfully reproduced in the motion of the sprocket chain pins 180 (Figure 10). While the pins 180 are moving the paper webs 161 upward the paper guide frame or bale 134 presses against the paper and holds the apertures 163 in engagement with the pins 180.

*Copying ribbon dispensing, guiding and feeding mechanism*

The copying ribbon or carbon paper, or other suitable material, is contained upon spools 181 (Figure 17) within the carbon paper holder 182, which in turn, is riveted to the arcuate bracket 183, the latter being secured by screws or rivets through the holes 184 to the right-hand side frame member 55. The ribbon holder 182 carries an ear 185 having a pivot 186 supporting an ear 187, mounted upon the arcuate cover 188 forming a portion of the peripheral wall of the ribbon holder 182. A coil spring 189 urges the cover 188 into a closing position. The cover 188 carries a knob 190, by which the cover may be opened and the ribbon spools 181 inserted or removed. The ribbon holder 182 is divided by partitions 191 into a plurality of compartments having outlet apertures 192 with edges 193 against which the carbon paper copying ribbons 194 are jerked during the feeding motion of the ribbons. This jerking causes the copying ribbons to become creased, as at 195, these creases assisting in reducing the curling of the ribbons which otherwise is an unsatisfactory tendency of such ribbons. The feeding mechanism by which the ribbons are fed step-by-step in synchronism with the line spacing operations is described below.

The copying ribbons 194, after emerging from the ribbon compartments 182, pass over an upper and a lower guide roller 196 and 197 (Figure 18). These guide rollers are mounted upon the stud shafts 198 and 199, respectively. Below these rollers the ribbons 194 are superimposed at the flanged rollers 200, 201 and 202, mounted respectively upon the studs 203, 204 and 205. The stud 203 is also mounted in the right-hand frame side member 55, whereas the studs 204 and 205 are mounted at one end in an ear 206 forming part of a bracket 207 attached to the lower part of the ribbon carriage, generally designated 208 (Figures 4, 28 and 29). The opposite end of the stud 205 is supported in an ear 209, likewise forming a part of the bracket 207. The stud 205 also forms a pivot for the movable clamping member 210 carrying the movable clamping jaw 211 (Figure 30). The clamping jaw 211 cooperates with a fixed jaw 212, the copying ribbons 194 passing therebetween. The fixed jaw 212 also forms a part of the bracket 207, and both jaws 211 and 212 have their lower edges inclined obliquely as at 213 and 214, respectively. The ends are inclined at an angle of approximately forty-five degrees so that the ribbons make a change of direction of approximately ninety degrees (Figures 28 and 29).

The bracket 207 is secured by the screws 215 to the carriage frame 216, this frame having spaced arms 217 and 218. Secured thereto are the clamping members 219 and 220, the two having common apertures 221 therethrough for the passage of the sprocket shaft 176. The apertures 221 are slightly larger than the diameter of the sprocket shaft 176 so that a sliding fit is secured whereby the carriage frame 216 may be moved to and fro along the sprocket shaft 176. The arms 217 and 218 and their clamping members 219 and 220 are likewise provided with notches 222 at their upper ends for the passage of the ribbon-feeding shaft 223, the driving mechanism of which is subsequently to be described. Mounted on the ribbon-feeding shaft 223 is a cam 224 (Figures 30 and 34) formed of separate halves 225 and 226, held together and to the shaft 223 by means of the screws 227.

As the ribbon-feeding shaft 223 rotates the cam 224 likewise rotates and causes the clamping member 210 to be moved in and out at its upper end, contact therewith being made against the ball 228 (Figure 34) seated in the socket 229, and having the adjusting screw 230 threaded into the threaded bore 231 against the back of the ball 228 (Figure 33). The outer end of the socket 229 is upset at its edge to form a retaining portion 232 for the ball 228 (Figure 33). The socket 229 is contained in a block 233, mounted upon the pivot screw 234 which is seated in the upper end of the movable clamping member 210. The thus pivoted block 233 is provided with a handle 235, under which the operator may insert his finger and swing the block 233 outward around its pivot 234. This can only be done, however, when the block 233 is unlocked. The block 233 on its lower end is provided with a notch 236, which is engageable by a detent 237 reciprocably mounted in the bore 238 of a fixed block 239 (Figure 33) secured by the rivets or screws 240 to the movable clamping member 210.

The fixed block 239 is provided with a transverse bore 241 serving as a seat for a coil spring 242, the upper end of which engages a collar 243 on the detent 237. Thus the spring 242 urges the detent 237 upwardly into locking engagement with the notch 236. In order to unlock the pivoted block 233 and swing it outward by means of the handle 235, the operator places his finger on the bent portion 244 at the bottom of the detent 237 (Figures 28 and 33), pushing it downward and disengaging it from the notch 236. The pivoted block 233 can then be swung outward to the left (Figure 33) and the ball contact member 228 removed from engagement with the cam 224. When this is done the parts occupy the positions shown in Figure 32. The purpose of this arrangement is to enable the ribbon to be clamped or unclamped manually by means of the handle 235, as well as automatically by the cam 224 in the manner subsequently to be described. The ribbon carriage is dismounted from the sprocket shaft 176 by loosening the screws 245 which hold together the portions 217 and 219, and also the portions 218 and 220. An arm 246 having a bent end 247 serves as a guide for the upper end of the movable clamping member 210, and has sliding engagement therewith. The bent arm 246 is L-shaped with the long portion secured to the arm 218 by means of the pins 248 in a groove 249 formed therein (Figure 30).

The ribbon carriage is urged to the right-hand end of the machine (Figures 28 and 29) by the coil spring 250. After the ribbon 194 passes between the clamping jaws 211 and 212 and passes around the oblique edge of the latter, it then moves at right angles to its original direction and now follows a path parallel to the axis of the main platen 86 and along the front face thereof at the printing position. Midway along the platen 86 the ribbons pass between successive runs of the paper webs 161 (Figure 19), it being understood that the foremost paper web is printed by typing or printing mechanism included in the main machine to which the manifolding machine of the present invention is attached. Where the main machine is provided with typing keys or bars it, of course, also has its own typing ribbon, hence, there is no necessity in the manifolding machine for providing such a ribbon for typing the outside paper web 161. Beyond the paper webs 161 and at the left-hand end of the platen 86 the copying ribbons 194 pass over the teeth 251 of the ribbon-feeding pin wheel 252 mounted on the shaft 253. Beyond the pin wheel 252 the copying ribbons 194, which as previously stated are of a "one-time" carbon paper material, pass into a waste basket or other receptacle. In the present machine, therefore, the copying ribbons are used but once and are not returned to their original spools, nor are they run back and forth several times between successive runs of the paper webs, as in prior machines.

The ribbon-feeding pin wheel 252 and shaft 253 are rotated by mechanism described below. This mechanism is synchronized with the line feeding and ejection feeding mechanism of the main machine in such a manner that the pin wheel 252 rotates a predetermined amount for a line spacing operation to provide a single step of movement of the copying ribbons 194. For ejection spacing feeding of the paper webs 161, however, the pin wheel 252 is rotated a plurality of times, the rotation imparted for a line spacing feeding of the webs 161, thereby effecting a plurality of steps of movement of the copying ribbons 194. The operation of the machine as a whole is described in detail below, but it is convenient to summarize the operation of the ribbon-feeding mechanism at this point.

When the pin wheel 252 is rotated by its mechanism in response to a line spacing movement of the paper web-feeding mechanism, the ribbon feed shaft 223 (Figures 4 and 28) rotates to cause the cam 224 (Figure 30) to bring about a clamping engagement of the jaws 211 and 212 with the copying ribbons 194 in the ribbon carriage 208. As the pin wheel 252 rotates, therefore, the ribbons 194 are pulled to the left (Figures 4 and 18), thus serving as a cord to pull the ribbon carriage 208 from its Figure 28 position to its Figure 29 position, overcoming the urge of the spring 250. When the pin wheel 252 has ceased its rotation the ribbon feed shaft 223 has meanwhile rotated the cam 224 from its Figures 30 and 34 positions to its Figures 31 and 35 positions, permitting the ribbon-clamping jaws 211 and 212 of the ribbon carriage 208 to open and release their grip upon the ribbons 194.

Under the urge of the spring 250, therefore, the carriage 208 returns from its Figure 29 position to its Figure 28 position. As the ends of the ribbons are anchored on the pins 251 of the now stationary pin wheel 252, the carriage 208, as it moves to the right, pulls a length of ribbon out of the ribbon container 182 with a jerk as the ribbon slides around the oblique edge 214 of the clamping jaw 212. The ribbon spools 181, before the jerk is given to the ribbons 194, occupy the solid line positions (Figure 17). When the jerk is applied to the ribbons as the carriage 208 is released by the relaxing of its grip upon the ribbons, the outlet edge 193 of the ribbon container 182 (Figure 17) forms a transverse crease 195 across each ribbon 194.

Under the further pull on the ribbons 194 the ribbon spools 181 move to the dotted line position (Figure 17) and the ribbon is pulled off the spool and out of the container 182. Thus, instead of the ribbon moving around the oblique edge 214 of the clamping jaw 212, the latter slides along the ribbon in order to withdraw more ribbon from the ribbon spools 181. With a subsequent movement of the pin wheel 252 the cam 224 again causes the jaws 211 and 212 to grip the ribbon, again pulling the carriage 208 to the left and again causing a creasing and pulling out of the ribbon when the pin wheel 252 halts and the jaws 211 and 212 are unclamped by the cam 224.

*Ribbon-feed driving and controlling mechanism*

The ribbon-feeding pin wheel 252 is rotated by very precise amounts, which are accurately maintained by mechanism controlled from the movement of the main machine in line spacing or in ejection spacing the paper webs 161. As previously stated, the control is taken off from the detent arm 110 carrying the detent roller 108 (Figure 47) engaging the detent ratchet wheel 106 of the main platen 86 in a manner now to be described.

The principal elements in the ribbon-feeding drive for the pin wheel 252 are a continuously running motor 43 (Figures 5 and 50), a flexible coupling 254 connecting the motor shaft 255 with the input shaft 256 of the clutch 257, a reduction gear box 258 attached to the clutch 257 (Figure 51) and the ribbon feed shaft 223 driven from and forming the output shaft of the reduction gear box 258, a gear 259 mounted on the shaft 223, a mutilated gear assembly 260 driven by the gear 259 and shaft 223 (Figures 4 and 20), and a ribbon feed pin wheel driving unit 261 driven from the mutilated gear assembly 260, the latter including the pin wheel 252. The mutilated gear assembly 260 transforms the regular rotation of the shaft 223 to an intermittent rotation of the pin wheel 252. In addition to this mechanism, there is also provided controlling devices for shifting the clutch control arm 262 to actuate the clutch in two predetermined manners, depending on whether a line spacing or an ejection spacing operation is being performed upon the paper webs 161.

The motor 43 is energized by electricity received through the cable 40 and rotates continuously subject to the manual switch 42 (Figures 4 and 37), and rotates the clutch input shaft 256 continuously through the flexible coupling 254. The clutch 257, the specific mechanism of which will be described subsequently under a separate heading, when actuated rotates the ribbon-feed shaft 223 either a single complete revolution or a plurality of complete revolutions, such as two revolutions when line spacing or ejection spacing is performed, respectively. Thus, when the clutch 257 is actuated by the shifting of its clutch control arm 262, in response to the action of the control mechanism hereinafter described, and assuming that a single line spacing motion of the paper webs 161 is being made by the mechanism of the main machine in cooperation with the sprocket chains 178 and pins 180, the clutch output shaft 263 (Figure 20) makes a complete revolution and halts exactly after performing this complete revolution. This motion is transmitted by the intermeshing spiral gears 264 and 265 of the gear box 258 to the ribbon-feed shaft 223, the gears 264 and 265 being drivingly connected to their respective shafts 263 and 223. As these gears are of the same number of teeth, the shaft 223 likewise performs a complete revolution and halts. It will be recalled that this shaft 223 also carries the cam 224 for clamping and unclamping the ribbon-gripping jaws 211 and 212 of the ribbon carriage 208.

The single revolution rotation of the shaft 223 is transmitted by the gear 259 (Figure 20) to the gear 266, mounted on the sleeve 267 encircling the sprocket shaft 176 but not drivingly connected thereto. In other words, the sprocket shaft 176 merely serves as a support for the sleeve 267 without any influence thereon, or vice versa. Since the gears 259 and 266 are likewise of the same number of teeth a single complete revolution is performed by the sleeve 267 of the mutilated gear assembly 260. Connected to the sleeve 267 and coaxial therewith is the mutilated driving gear 268 having but two teeth 269, the remainder of the gear being without teeth. Coacting with the mutilated driving gear 268 is the mutilated driven gear 270 having a plurality of sets of teeth 271, with three teeth in each set, the various sets being separated by intervals 272 free from teeth. The mutilated driving gear 268 is mounted upon the reduced diameter portion 273, whereas the mutilated driven gear 270 is mounted upon the shaft 274, the shafts 176 and 274 being held at their proper separations by the tie plate 275.

Drivingly mounted upon the shaft 274 is a spiral gear 276 forming a part of the pin wheel driving unit 261 (Figure 25). The spiral gear 276 meshes with a similar spiral gear 277 (Figure 24) within the casing 278 of the unit 261. The spiral gear 277 is mounted upon a sleeve 279 having integral therewith annular ridges 280 and 281, separated by an annular groove 282. The sleeve 279 is loosely mounted upon the reduced diameter portion 283 of the shaft 284 (Figure 24), and retained in position by the retaining screw 285 mounted in the casing 278 and having its reduced diameter tip extending into the groove 282. The shaft 284 is integral with the shaft 253, upon which the pin wheel 252 is mounted, the shaft 253 thus forming a lower reduced diameter portion of the shaft 284. The upper reduced diameter portion 283 of the shaft 284 extends upwardly through the top of the casing 278 and through a knob 286 having a bore 287 slidably engaging the shaft portion 283, and an enlarged counter-bore 288 adapted to receive a coil spring 289, the upper end of which is held in place by the washer 290 retained in position by the set screw 291, threaded into the threaded socket 292 in the top of the shaft portion 283.

The shaft portion 283 is provided with a keyway 293, which is engaged by the key-like head 294 of a T-shaped stud 295 loosely mounted in the transverse hole 296 in the knob 286. In this manner a driving connection is established between the knob 286 and the shaft 284. The knob 286 is provided with a radial slot 297 extending from the bore 287 outwardly to the edge thereof, and adapted to receive a pin 298 mounted in the upper face of the spiral gear 277 and projecting upwardly therefrom. The shaft 284 itself is retained in position by a retaining pin 299 passing through the hole 300, and engaging an annular groove 301 in the shaft 284 (Figures 24 and 26). Mounted upon the shaft portion 253 is a sleeve 302 (Figure 24) having a plate 303 (Figures 24 and 25), on the lower end thereof, with downwardly extending projections 304 and 305. The projection 304 is in the form of an elongated straight flange for guiding the copying ribbons 194 past the pin wheel 252, the teeth 251 of which push their way through the copying ribbons 194, thereby propelling the copying ribbons 194 as the pin wheel 252 rotates. The flange 304 is slotted, as at 306, for the passage of the pins 251. Secured to the projection 305, as at 307, is a spring member 308, slotted at 309 (Figure 23) for the passage of the pins 251 and having a hook-like end 310. The spring member 308 is likewise provided with an upstanding portion 311 projecting vertically upward adjacent the enlarged portion 312 of the casing 278. The casing 278 is secured by the screws 313 to the left-hand frame side member 55.

In the operation of the pin wheel driving unit 261 the intermittent rotation imparted by the mutilated gear 270 to the spiral gear 276 (Figure 25) is, in turn, transmitted to the spiral gear 277 and from it to the knob 286 by way of the pin 278 engaging the radial slot 297 in the bottom of the knob 286. This drive is, in turn, transmitted from the knob 286 to the shaft portion 283 by the engagement of the key-like head 294 of the T-headed stud 295 with the keyway 293. The rotation of the shaft portion 283 directly rotates the shaft 284 and its extension 253 carrying the pin wheel 252, thereby causing the copying ribbons 194 to be drawn forward by the engagement of the pointed pins 251 therewith. The copying ribbons 194, which have meanwhile been threaded through the space between the flange 304 and the pin wheel 252 (Figure 27), are perforated by the pin wheel and remain on the pins 251 thereof until they are pushed off by the slotted end of the spring member 308 while the pins 251 pass through the slot. If, however, the operator desires to withdraw some of the ribbons by hand, he merely raises the knob 286 against the urge of the coil spring 289 (Figure 24), thereby pulling the slot 297 out of engagement with the driving pin 298 on the spiral gear 277 and disconnecting the drive of the shaft 284 and its portion 253. The operator can then pull a length of the copying ribbons 194 out from the apparatus, and the pin wheel 252 will merely rotate as the ribbons 194 are withdrawn past it.

*Clutch control mechanism*

The mechanism by which the clutch 257 is shifted automatically, either to perform a single length feeding of the copying ribbons 194 for a single line spacing, or a multiple length thereof for a multiple ejection spacing of the paper webs 161, is shown in perspective in Figure 37. The internal mechanism of the clutch 257 will be subsequently described. The clutch, however is as previously stated, shifted in response to the clutch-tripping arm 262 and performs either a single complete revolution of its output shaft 263 (Figure 20), or a plurality of such revolutions, preferably two, depending upon whether a line spacing or an ejection spacing is being performed. The output shaft 263 then comes to a halt and the clutch-tripping arm 262 is automatically brought back to its starting position by its own mechanism, hereinafter described.

The single length feeding mechanism for the ribbons 194 is controlled by the devices shown in Figures 37 and 47. When a single line spacing of the main platen 86 is performed, the ratchet wheel 106 (Figure 47) moves through a distance of one tooth 107. The motion of this tooth forces the detent roller 108 outward, thereby swinging the detent arm 110 outward. The detent arm 110 is engaged by a contact portion 314 on the bracket 315 attached to the lever 316 which carries the pivot pin 317, separated by ball bearings 318 from the bearing ring 319 mounted in the bracket 320 attached to the left-hand frame side member 55 (Figures 1, 3 and 47). The upper end of the lever 316 operatively engages the pin 321 mounted on the sliding link 322 having a guideway 323 in the form of a straight edged notch engaging the guide roller 324, mounted on the screw 325 in the frame side member 55. The link 322 carries a knob 326 for manually moving the sliding link 322 in order to bring about a manual feeding of the ribbons 194 through one length, if desired.

The sliding link 322 is provided with an ear 327 serving as an anchorage for one end of a coil spring 328, the opposite end of which is secured, as at 329, to an arm 330 loosely mounted upon a shaft 331 (Figure 47) and retained in position by the screw 332, threaded into the end of the shaft 331. The shaft 331 itself is supported in a bearing plate 333 secured by the screws 334 to the frame side member 55. The lower end of the arm 330 is connected by the pivot pin 335 to the end of the sliding link 322. At an intermediate point the arm 330 is provided with a member 336 having an aperture 337 therein for the passage of a screw 338 fixedly mounted at its opposite ends in the bent portions 339 integral with the arm 340. Lock-nuts 341, threaded upon the screw 338, may be loosened in order to swing the arm 330 relatively to the arm 340, thereby providing a fine adjustment between the two arms 330 and 340. After this adjustment of the relative positions of the arms 330 and 340 has been made, they may be locked in their adjusted positions by tightening the locknuts 341.

The shaft 331 (Figure 47) passes through the bearing portion 342 and also through the plate 343 abutting the frame side member 55 (Figure 37), and emerges on the opposite side thereof, after which it passes through a sleeve 344 mounted in the spaced arms 345 and 346 of a bracket 347. Mounted on the end of the shaft 331 (Figure 37) is a finger 348. When the lower end of the lever 316 (Figure 47) is swung outward by the outward motion of the detent arm 110, in a line spacing operation, it moves the sliding link 322, arms 330 and 340 toward the front of the machine, thereby rotating the shaft 331 and swinging the finger 348 toward the frame cross member 76 at the front of the machine (Figure 37), thereby withdrawing the finger from its position over the clutch-tripping arm 262. The latter is then free to swing upward into its clutch-actuating position under the urge of the coil spring 349, secured to the pins 350 and 351 mounted on the clutch-tripping arm 262 and bracket arm 346, respectively. Normally, however, the finger 348 prevents the upward swinging of the clutch-tripping arm 262.

Mounted on the end of the sleeve 344 after its emergence from the bracket arm 346 (Figure 37) is a second finger 352, which is actuated during the ejection spacing operation. The mechanism for actuating the finger 352 is controlled in response to the shifting of the ejection spacing rod 119 and arm 123 of the main machine (Figures 46 and 47). In the operation of ejection spacing the arm 123 is swung to the left (Figure 46), thereby forcibly pulling the detent arm 110 and detent roller 108 away from the line spacing ratchet 106. This operation swings to the left an arm 353 (Figure 46) mounted upon the end of a shaft 354, which passes through the frame side member 55 and has secured to the opposite end thereof a split block 355 (Figure 37) carrying a bellcrank 356, one arm of which carries a stop pin 357 adapted to engage a stop 358 mounted upon the frame side member 55 in order to limit the motion of the bellcrank 356. Pivotally secured to a pin 359 at the end of the other arm of the bellcrank 356 is a link 360, the opposite end of which is pivoted to a pin 361 (Figure 48) passing through the lower end of an arm 362 secured at its upper end to the sleeve 344 by means of a collar 363 (Figures 41 to 44).

Consequently, when the mechanism of the main machine operates in an ejection spacing operation and shifts the arm 123 rearwardly (Figure 46), this action swings the arm 353 rearwardly to rotate the shaft 354 and swing the bellcrank 356, link 360 and arm 362 rearwardly. This motion is transmitted to the sleeve 344 in such a manner as to swing the finger 352 rearwardly over the clutch-tripping arm 262 at the same time the finger 348 is being swung forwardly out of engagement with the clutch-tripping arm 262, by the motion transmitted thereto from the detent arm 110 associated with the platen ratchet wheel 106. In this manner the fingers 348 and 352 (Figure 37) move in opposite directions, the finger 348 operating during a line spacing operation and the finger 352 during an ejection spacing operation.

The arm 362 is normally urged toward the front of the machine by a coil spring 364, secured at 365 to the arm 362 and at its other end to the pin 366 mounted on the cross member 76. As the clutch-tripping arm 262 is automatically returned to its starting position (Figure 37) after every revolution of its output shaft 263 (Figure 20), means must be provided to hold the finger 348 away from the clutch-tripping arm 262 so as to permit it to swing upwardly again to perform the multiple actuations required in an ejection spacing opertion. The mechanism for thus holding the finger 348 is shown in Figures 37 to 40, inclusive.

The frame cross member 76 carries a pair of brackets 367 which rotatably support a rock shaft 368 upon which is mounted a sleeve 369 carrying a latch arm 370 with a hooked end 371 (Figure 39). The same end of the sleeve 369 also carries an arm 372 with a notch 373 in the upper edge thereof. A coil spring 374, connected at one end to a pin 375 on the arm 372, and at its other end to a bracket 376, constantly urges the latch 370 downwardly into engagement with a square pin 377 projecting laterally from the finger 348. A similar square pin 378 projects from the finger 352 and is engaged by a rocking member 379 pivoted on the pin 380 upon a bent lever 381, also mounted upon the sleeve 369 (Figure 39). The opposite end of the member 379 carries a pin 382 to which is attached a coil spring 383, urging it downwardly toward the pin 384 mounted on the lower end of the bent lever 381. The purpose of this construction is to permit the tip 385 of the rocking member 379 to rest solidly upon the square pin 378 when above the latter, yet be able to return to the position shown in Figure 39 when the rocking member 379 is below the square pin 378. When this occurs the tip 385 of the rocking member 379 merely yields and overcomes the urge of the coil spring 383, snapping back into position after the rocking member 379 clears the square pin 378.

The sleeve 369, carrying the arms 370 and 372 and the bent lever 381, is mounted so as to be slidable longitudinally along the rock shaft 368. The lower end 386 forming the point of attachment of the coil spring 374, is displaced laterally relatively to the pin 375 (Figure 38) in order to impart an axial pull to the sleeve 369 so as to urge it toward the left-hand side plate 55 (Figure 38). The lower edge of the tip of the arm 372 is adapted to move downwardly into the groove 387 of a worm-like cam 388, having an ascending portion 389 mounting to the periphery of an approximately cylindrical member 390 (Figures 37 and 38) mounted upon the ribbon-feed shaft 223. The member 390 is made in halves and assembled and held together by the screw 391. Its position on the shaft is located by means of the collars 392 and 393, secured by set screws to the ribbon-feed shaft 223. The cylindrical member 390 is slotted, as at 394 (Figure 37), to admit the tip of a detent lever 395 also mounted on the rock shaft 368 and urged into engagement with the slot 394 by the spring 396.

In the operation of the clutch control mechanism, when an ejection spacing movement of the main platen 86 is made, the detent arm 110, carrying the detent roller 108, moves rearwardly and shifts the lower end of the lever 316 (Figure 47). This action, through the mechanism of Figure 47 previously described, moves the finger 348 forwardly, permitting the clutch-tripping arm 262 to move upwardly under the urge of the coil spring 343. The internal mechanism of the clutch 257 then causes the ribbon-feed shaft 223 to execute a complete revolution and then halt, the same mechanism returning the clutch-tripping arm 262 to its lower position, whereupon the finger 348 moves back over the clutch-tripping arm 262 in order to hold it in its downward position. The return of the finger 348 follows from the return of the detent roller 108 into the next notch of the platen ratchet wheel 106, attached to the main platen 86. The return of the roller 108 causes the detent arm 110 to move forward (Figure 47), this action permitting the lower end of the lever 316 to move forward and accordingly causing the finger 348 (Figure 37) to move rearwardly over the now returned clutch-tripping arm 262.

Meanwhile, the arm 372 has been held in its raised position (Figure 37) out of engagement with the cam groove 387 (Figure 38), and the latch arm 370 held with its hook portion 371 out of engagement with the square pin 377 by the tip 385 of the rocking member 379 resting upon the square pin 378 (Figure 39). Thus, during this operation, the ribbon-feed shaft 223 makes a complete revolution and then halts, thereby effecting a complete revolution of the ribbon carriage-operating cam 224 (Figures 28 to 36), as well as a rotation of the pin wheel 252 by the actuation of the pin wheel driving unit 261 from the ribbon-feed shaft 223 by way of the gear 259 and the mutilated gear assembly 260 (Figure 20).

Thus, the ribbons 194 are moved to the left a single feeding length while the ribbon carriage 208 is clamped to the ribbons by the action of its clamping jaws 211 and 212 (Figure 29). Toward the end of the rotation of the ribbon-feed shaft 223, however, the cam 224 releases the ribbon-clamping jaws 211 and 212 (Figures 31 and 35), thereby permitting the ribbon to return to its Figure 28 position by sliding along the ribbons 194 and causing an additional length of the ribbons to be withdrawn from the ribbon container 182, in the manner previously described.

In the ejection spacing operation of the main machine, however, the main platen is rotated the equivalent of several line spaces, and such motion is imparted to the paper webs 161 by the feeding pins 180 attached to the sprocket chains 178. This operation, as previously stated, is for the purpose of ejecting one paper form from the typing or printing position and bringing the next paper form into that position. It is understood, of course, that the paper webs 161 are composed of a large number of paper forms of a definite length, usually separated by weakening perforations or tear-off lines. During the line spacing operation the ribbons are thus moved while the paper is moving; during the ejection spacing operation, however, the paper completes its movement before the ribbons begin to move. The slight bowing-up of the ribbons in the latter case is immediately removed when the ribbons begin to move. During the ejection spacing operation, as previously stated, the rod 119 (Figures 46 and 47) is moved rearwardly by the mechanism in the main machine, thereby swinging the arm 123 rearwardly and with it the arm 353 on the shaft 350. This action swings the lower end of the bell-crank 356 rearwardly together with the link 360 and the arm 362. The consequent motion of the sleeve 344 moves the finger 352 rearwardly so that its lower end moves over the clutch-tripping arm 262. Meanwhile, however, the finger 348 has been moved forwardly away from the clutch-tripping arm 262 so that the latter is still held down in its inoperative position by the finger 352, even though the finger 348 has been withdrawn. This permits the ejection spacing operation to take place before movement of the ribbons.

The forward motion of the finger 352 causes the square pin 378 to be withdrawn from beneath the tip 385 of the rocking member 379, thereby permitting the latter to move downward (Figure 39) and allowing the hooked end 371 of the arm 370 to drop down over the square pin 377 on the finger 348, which has been moved toward the front of the machine (to the right-hand of Figure 39) by the line spacing operation which occurs through the controlling action of the lever 316 (Figure 47) when the detent arm 110 is pulled rearwardly by the rod 119 in an ejection spacing operation.

The dropping of the rocking member 379 by the withdrawal of the square pin 378 also permits the end of the arm 372 to drop down into the cam groove 387 of the worm-shaped cam 388 (Figure 38). No ribbon feeding occurs, however, until the paper movement in the ejection spacing operation has been completed, because the finger 352 is preventing the clutch-tripping arm 262 from moving upward. As soon as the ejection spacing movement is completed, however, the detent arm 110 is permitted to move forward by the returning bar 119 (Figure 47), whereupon the finger 352 moves forward away from the clutch-tripping lever 262 to bring about rotation of the ribbon feed shaft 223 through the internal mechanism of clutch 257. Lever 262 being thus freed then moves upward, and the clutch rotates the shaft 223 through a single revolution as the finger 348 is locked meanwhile by the hooked arm 370 in its withdrawn position.

The rotation of the ribbon-feed shaft 223 rotates the worm-shaped cam and causes the arm 372 to be moved toward the cylindrical member 390, at the same time moving the arms 370, 381 and 385, together with the sleeve 369 axially along the rock shaft 368, overcoming the tension of the spring 374. Meanwhile, since the finger 348 is now held latched forward of its Figure 37 position and withdrawn from above the clutch-tripping arm 262, the latter, upon being returned to its position of Figure 37 by the internal mechanism of the clutch 257 after the completion of a single revolution of the shaft 223, is free to move upward a second time under the urge of the spring 343, thereby causing the clutch 257 to rotate the shaft 223 through a second complete revolution immediately after the completion of the first revolution thereof. When this occurs, the two revolutions of the shaft 223 move the tip of the arm 372 entirely along the groove 387 in the worm-like cam 388 and up the ascending portion 389 thereof (Figures 37 and 38) onto the periphery of the cylindrical member 390, where the arm 372 arrives at precisely the end of the second revolution of the shaft 223.

The rising of the end of the arm 372 causes a consequent rise in the hooked end 371 of the arm 370, raising it out of engagement with the square pin 377 (Figure 37), whereupon the finger 348 is moved rearwardly over the clutch-tripping arm 262 as the latter is returned to its lower position by the internal clutch mechanism at the end of the second revolution of the shaft 223. The clutch-tripping arm 262 is prevented from ascending to provide a third revolution thereof by the return of the finger 348 to its Figure 37 position. After this ejection spacing action, therefore, the pin wheel 252 has been caused to feed the copying ribbons 194 through two spaces instead of one, as in a line spacing operation, thereby insuring that the ribbons will be completely detached from adhesion with the paper forms after the ejection spacing operation has occurred. The finger 352 is returned to its Figure 37 position as soon as the detent arm 110 and roller 108 are returned to the ratchet wheel 106 (Figure 47) as the main machine mechanism releases the rod 119.

As the ribbon-feed shaft 223 reaches the end of each revolution, the detent 395 drops into the notch 394 and yieldingly halts and holds the cylindrical member 390 at the same location on every revolution. The spring 396, however, holds the detent 395 yieldingly in the notch 394 so that the next power-driven revolution of the cylindrical member 390 will overcome the detent action of the detent 395. The end of the arm 372, which has now been moved along the worm-like cam 388 and up the ascending portion 389 to the periphery of the cylindrical member 390, remains in this location until the next line spacing operation. When the latter occurs the end 397 of the ascending portion 389 clears the edge of the arm 372, permitting it and the sleeve 369 to be pulled along the rock shaft 368 by the coil spring 374 (Figures 38 and 39), ready for the beginning of another ejection spacing operation. The parts come to rest in the position shown in Figure 39, the end of the rocking member 379 on the arm 381 clicking over the square pin 378 as it rises.

The main printing machine has mechanism which provides for the "eject" movement of the paper. The manifolding attachment uses that mechanism to produce an extra movement of the ribbon immediately after an "eject" spacing. The arm 123 and link 119 are a part of the "eject" mechanism of the main printing machine and in an "eject" spacing operation they move rearwardly (leftwardly as seen in Figure 46) moving the finger 353 rearwardly, thereby moving finger 352 rearwardly into locking position over the clutch arm 262. At the same time, the hook 118 on the end of the link 119 causes the disengagement of the line spacing roller 108, moving it in its normal line spacing direction and actuating all the linkage back to the finger 348, causing this finger to move forwardly out of engagement with the clutch arm 262. Up to this point, no ribbon has been fed, ribbon feeding shaft 223 remaining stationary. However, the "eject" movement of the paper is taking place and when this movement is terminated, the original actuating linkage 123 and 119 will execute a return movement and the finger 353 with all of the linkage back to and including the finger 352 will be returned to normal position by the spring 364 seen in Figure 48, allowing clutch arm 262 to move upwardly. As finger 352 was moved in over clutch operating arm 262 at the beginning of the "eject" spacing operation, the assembly associated with the sleeve 369 was rotated counter-clockwise as seen in Figure 39 by the spring 374, the retaining pin 378 having released the finger 385 by the forward movement of finger 352. Since the hook 370 rotates simultaneously with the sleeve 369, it drops with its end 371 engaging square pin 377 which has been moved forwardly with finger 348, and thus insures that the finger 348 will be retained in its forward position even after the "eject" actuating mechanism of the record printing machine has restored the roller 108 to its normal position on the toothed wheel 106.

When the mechanism associated with the sleeve 369 is moved counter-clockwise by the spring 374 the blade 372 drops into the groove 387 of the worm-like cam 388. Thus, although no movement of the ribbon has so far taken place, the mechanism is in readiness to produce this movement upon the return of the link 119 to its normal forward position. When this motion of the link 119 takes place, the finger 352 is retracted forwardly from its latching position over the clutch arm 262, whereupon this arm 262 will be moved upwardly into clutch-operating position by the spring 349, causing ribbon-feeding shaft 223 to rotate in cycles of single revolutions, arm 262 returning downwardly after each revolution, and then moving upwardly if not prevented. Sleeve 369, and the parts which it carries, is moved along the shaft 368 by the worm 388, this worm being rigidly mounted on shaft 223 and rotating with it. While the sleeve 369 is thus being moved, the hook 371 remains in locked engagement with the stud 377, this stud being long enough to prevent the hook 371 from riding off the end of square stud 377. The clutch 257 will operate so long as the mechanism is in the condition just described, the operating arm 262 being free to initiate a new clutch cycle under the influence of the spring 349 every time it returns to the position shown in Figure 37. When the blade 372 has traveled the length of the worm 388 and rides up on the cam 390, the hook 371 disengages from the square stud 377, allowing finger 348 to move rearwardly over clutch operating lever 262, this taking place after the ribbon feeding shaft 223 has executed the number of revolutions provided by worm 388 (in this case two), and clutch operating lever 262 having been returned downwardly to the position of Figure 37 after the last revolution of shaft 223 by the mechanism contained within the clutch 257. Blade 372 rests in its position upon cam 390, held there by the wall 389, until the next line spacing movement in which end 397 of wall 389 clears the blade 372 in its rotation, permitting the spring 374 which has been stretched laterally with the movement of sleeve 369, to cause the return movement of this sleeve along shaft 368 preparatory for the next ejection spacing operation. When blade 370 moves upwardly to release the hook 371 from the stud 377, thereby allowing finger 348 to move rearwardly over arm 262, the spring loaded lever 379 simultaneously clicks upwardly over square stud 378 mounted on finger 352 and thus holds sleeve 369 in its upward position until the next ejection spacing operation.

Internal clutch mechanism

The internal mechanism of the clutch 257 forms the subject-matter of the copending application, Ser. No. 258,015, filed February 23, 1939, of William C. Pfeiffer. This clutch mechanism, however, is described in the present specification because of its action in causing the ribbon-feed shaft 223 to execute a single complete rotation and then halt. The clutch 257 consists of a casing 398 (Figure 37) having a cover plate 399 secured thereto by the screws 400, and carrying a shaft bearing member 401 thereon. The cover plate 399 is connected to the frame cross member 76 by the tie member 402. The casing 398 is provided with a reduced diameter portion 403 (Figures 51 and 52), terminating in a flange 404.

The casing 398 is provided with a chamber 406 (Figure 52) continuing in a bore 407 passing through the reduced diameter portion 403, and having a bearing sleeve 408 therein, the flange 409 of which abuts the end wall of the chamber 406. The input shaft 256 of the clutch 257 is rotatably mounted in bearing supports 410 and 411, screwed to the opposite ends of the casing 398. Within the chamber 406 the clutch input shaft 256 carries a worm 412 meshing with a worm wheel 413, riveted to the flange 414 of a hollow shaft 415 (Figure 52). Driving secured to the reduced diameter portion 416 of the hollow shaft 415 is a ratchet wheel 417, which is rotated by the worm wheel 413.

Figure 63:
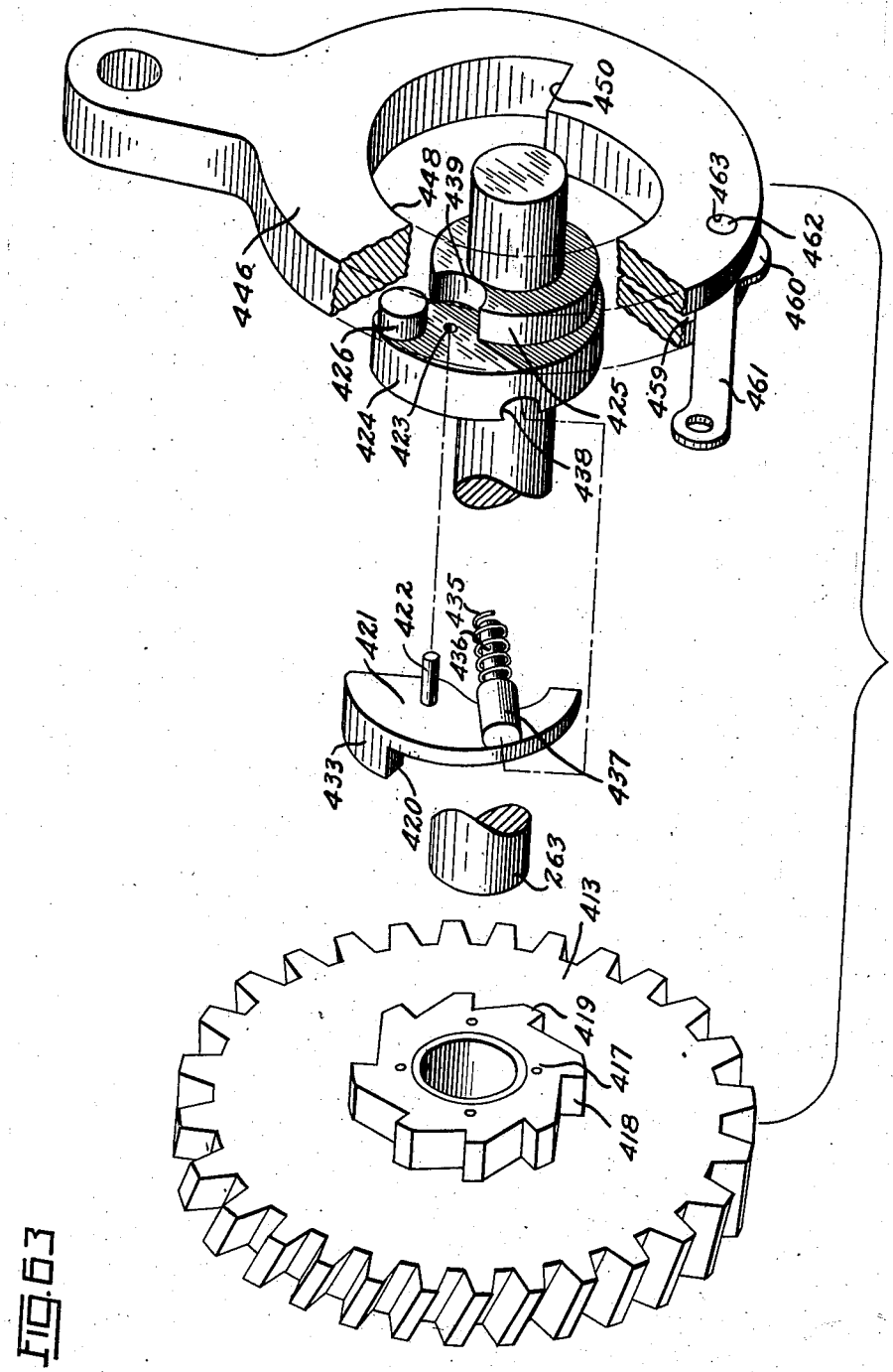
Figure 63 is an exploded perspective view showing the clutch worm wheel, ratchet, ratchet pawl, cam and accessory parts of the clutch shown in Figures 50 to 62, inclusive.

Adapted to be engaged by the steps 418 between the teeth 419 of the ratchet wheel 417 is the contact portion 420 of a pivoted pawl 421, having a pivot pin 422 pivotally mounted in the bore 423 in the locking member 424 (Figure 63), the latter having a hub 425 integral therewith. The locking member 424 additionally carries a pin 426 projecting from the side wall thereof. The locking member 424 and hub 425 are mounted on the clutch output shaft 263, which passes through the bore 427 of the hollow shaft 415 and into the interior of the reduction gear box 258, where it carries the spiral gear 264 (Figure 20) meshing with the spiral gear 265 on the ribbon-feed shaft 223, as previously described. The latter is rotatably supported in the bearing supports 428 and 429 (Figures 50 and 51) screwed to the sides of the reduction gear box casing 430. The latter carries the flanged portion 431, by which it is secured to the flange 404 of the clutch casing 398. The bracket 347 is supported on the flange 431 of the reduction gear box casing 430 by the screws 347ᵃ (Figure 48) in the slot 347ᵇ (Figure 42).

Figure 61:
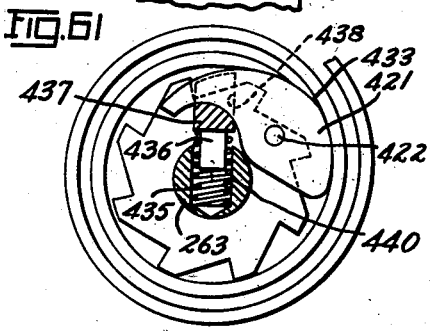
Figure 61 is a vertical sectional view of the ratchet and pawl of the clutch, taken approximately along the line 61—61 in Figure 59, showing how the pawl is spring-pressed to engage the ratchet.
Figure 62:
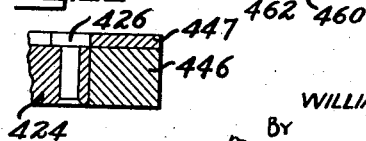
Figure 62 is an oblique section through the pivotal connection between the clutch cam, the clutch yoke-retaining plate and the clutch yoke, taken approximately along the line 62—62 in Figure 53.

The ratchet 417 is surrounded by a spiral spring 432 (Figures 52 and 57), the inner convolutions of which engage the periphery 433 of the pawl 421 and urge it inwardly toward engagement with the ratchet steps 418. An additional urge of the same nature is imparted to the opposite end 434 of the pawl 421 by a coil spring 435 surrounding the pin 436, terminating in the head 437 which rests in the groove 438 on the opposite side of the locking member 424 from the pin 426. The hub 425 is cut away, as at 439, to provide free access to the pawl pivot pin 422. The shaft 263 is provided with a transverse socket 440 for receiving the coil spring 435 (Figure 61). The rearward end of the shaft 263 is rotatably supported in a socket 441 in the bearing member 401, secured to the cover plate 399 (Figure 52).

Figure 58:
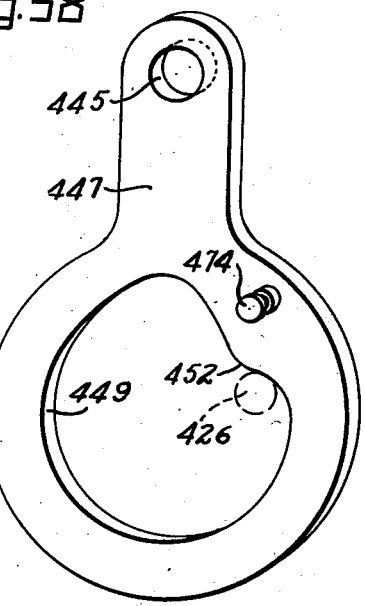
Figure 58 is an enlarged perspective view of the yoke-retaining plate of the clutch.
Figure 59:
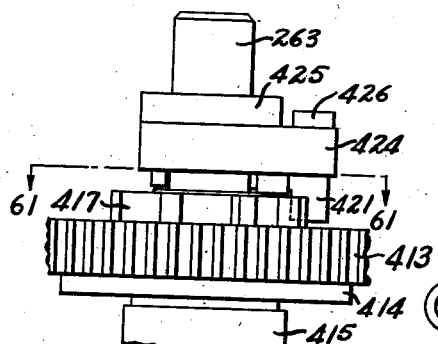
Figure 59 is a top plan view of the clutch worm wheel, ratchet and cam shown in Figure 57, with the worm and spiral spring removed.
Figure 60:
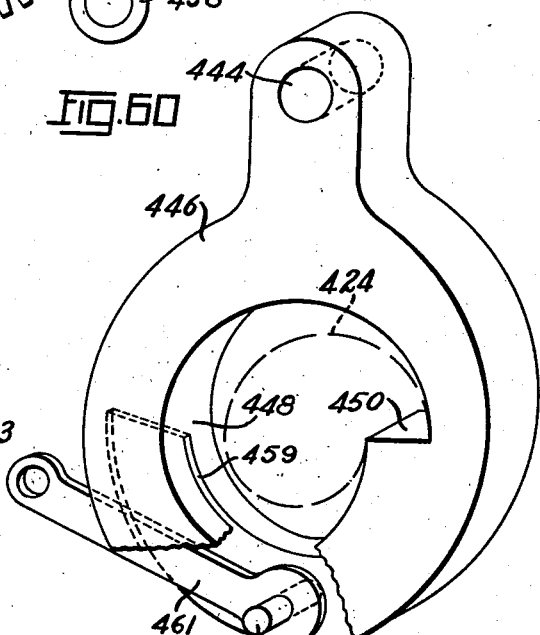
Figure 60 is an enlarged perspective view of the yoke plate associated with the yoke-retaining plate of Figure 58 within the clutch.

Disposed between the cover plate 399 and the clutch casing 398 is a supporting plate 442 carrying a pivot pin 443 entering the aligned apertures 444 and 445 in the locking plate 446 and retaining plate 447, respectively (Figures 52, 58 and 60). The plates 446 and 447 are pendulum-shaped and are provided with apertures 448 and 449 forming internal cam surfaces. The aperture 448 is provided with an abrupt step 450 which serves to receive the engagement of the forward portion 451 on the locking member 424. The aperture 448, however, is large enough to contain the locking member 424 and yet to move sidewise around its pivot pin 443 sufficiently to enable the portions 450 and 451 to separate and clear one another and unlock the device. Similarly, the aperture 449 of the retaining plate 447 is of a similar size to the aperture 448 and likewise provides a cam surface for the engagement of the pin 426. An edge portion 452 of the aperture 449 is in the form of an inwardly directed V for permitting the pin 426 to move member 447 in and out toward and away from the center of the shaft 263, as described below.

The locking plate 446 is spaced from the spiral spring 432 by the spacing disc 453 (Figure 52), which is provided with an ear 454 (Figure 53) supported on the pin 455, which is mounted in the end wall of a side chamber 456. A spacing collar 457 spaces the ear 454 from the supporting plate 442. The same pin 455 also serves to anchor the eye 458 on the outer end of the spiral spring 432 (Figure 57). The lower portion of the locking plate 446 is provided with an arcuate slot 459 (Figure 60) which receives one end 460 of a link 461, which is pivoted thereto by means of the pivot pin 462 passing through the hole 463 in the locking plate 446 (Figure 53). The opposite end of the link 461 is engaged by the pin 464 on the end of the arm 465, mounted upon one end of the shaft 466. This shaft passes through the tubular bearing support 467, which is threaded into a plug 468 (Figure 51), which in turn, is mounted in the bore 469 in the casing 398. The bore 469 serves to receive a spiral compression spring 470, one end of which engages the hub 471 of the arm 465 and forces it and the shaft 466 to the right against the supporting plate 442. The opposite end of the shaft 466 is slidable in the aperture 472 within the flange 404. The retaining plate 447 is continually urged toward the left (Figure 53) by a coil spring 473 anchored to the pin 474 on the retaining plate 447, and at its opposite end in the hole 475 within the base 476 of the pin 443. The shaft 466, near its outer end, carries the clutch-tripping arm 262 having the pin 350 urged upwardly by the coil spring 343, as previously described.

In the operation of the clutch 257 the motor 43 and input shaft 256 rotate continuously as long as the motor 43 is energized (Figure 50). Thus the worm 412, mounted on the shaft 256, causes the worm wheel 413 to rotate continuously. Normally, however, the clutch parts are in the position shown in Figure 53, arranged in such a manner that the clutch output shaft 263 does not rotate because the contact portion 420 of the pawl 421 is forcibly held out of engagement with the steps 418 on the ratchet 417, thereby rendering the ratchet 417 incapable of driving the output shaft 263 through the pawl 421 mounted on the locking member 424.

The reason that the pawl 421 is held out of engagement with the ratchet wheel 417 results from the fact that its forward face engages the step 450 on the edge of the aperture 448 in the locking plate 446 (Figures 60 and 63), the same step being likewise engaged by the forward portion 451 on the locking member 424 (Figure 53). When the clutch-tripping arm 262 is lifted by the spring 343, when the finger 348 moves away from it, this action rotates the shaft 466 clockwise (Figure 53), and swings the arm 465, link 461 and locking plate 446 to the right, moving the step 450 thereof out of engagement with the forward portions 451 of the locking member 424 and pawl 421, respectively. The parts now occupy the positions shown in Figure 54.

When thus released the contact portion 420 of the pawl 421 is pushed into the path of one of the steps 418 on the ratchet wheel 417, urged by the coil spring 435 and the spiral spring 432. The rotating ratchet wheel 417 immediately starts the output shaft 263 in rotation by its clutching engagement with the pawl portion 420, thereby swinging the pawl 421 and locking member 424 into the positions shown in Figure 55. Meanwhile, the pin 426 engages the edge of the aperture 448 on its left-hand side and swings the locking plate 446 to the left, together with the link 461 and the arm 465, rotating the shaft 466 counter-clockwise and swinging the clutch-tripping arm 262 downwardly into its normal or inoperative position, where it is immediately held by the finger 348 upon its return (Figure 37) after a line spacing operation, as previously described. The parts continue to rotate in clutching engagement until they reach the positions shown in Figure 56, whereupon the pin 426 pushes the retaining plate 447 to the right, and the forward portions 451 of the locking member 424 and pawl 421 engage the step 450 on the locking plate 446. This engagement rocks the pawl 421 around its pivot pin 422 and swings the contact portion 421 out of the path of the ratchet steps 418, thereby disconnecting the clutch output shaft 263 from operative engagement with the ratchet 417, and hence, with the clutch input shaft 256. The motor 43, clutch input shaft 256, worm 412, ratchet wheel 413 and ratchet 417 now rotate freely and idly, without rotating the output shaft 263 until the clutch-tripping arm 262 is again released by the finger 348, in the manner previously described, whereupon the output shaft 263 again is caused to execute a complete revolution and then halt, in accordance with the action of the pawl and ratchet mechanism described above.

*Operation of the machine as a whole*

The operation of the individual units of mechanism of the machine has already been described in connection with the construction thereof. It is therefore necessary merely to summarize the operation of the machine as a whole in order to understand its complete action.

In the operation of the manifolding machine of this invention, if the machine has been folded as in Figure 3, it is unfolded around its pivots into the position of Figure 1, as previously described, so that the various notches 59, 82 and 84 are hooked over the corresponding portions on the main machine. During this operation, of course, the frame of the machine is extended into the position shown in Figure 1. With the manifolding machine thus locked to the main machine, the gear 166 meshes with the gear 165, which in turn, meshes with the platen gear 105.

A printing machine of standard type usually provides as part of its equipment, not only the platen gear 105, but also the idler gear 164 (Figure 22) which meshes therewith. This idler is furnished by the manufacturer of the printing machine (not shown) for the purpose of synchronizing the ribbon-feeding mechanism of the manifolding machine with the line spacing mechanism of the platen roll. This ribbon-feeding mechanism is operated through the gears 166, 170 and 174 (Fig. 22) deriving its power from the platen idler 164. When the manifolding machine is swung into operative position with respect to the printing machine, meshing engagement is made between the gear 166 secured to the manifolding machine and the gear 164 which forms part of the printing machine. It will be understood that the manifolding machine may weigh as much as fifty pounds and considering its large moment arm about the center of the pivot 17, some provision must be made to prevent a heavy pressure contact between the two gears. Such pressure, if excessive, will result in prohibitive friction and consequent wear. This contact pressure is relieved in accordance with one of the features of my invention by means of the pivotally mounted frame including the side members 21, 22, one end of which carries the entire weight of the manifolding attachment and the other end is adjustably secured at the slot 28.

The thrust of the weight of the machine upon the main platen is then reduced by loosening the threaded collars 31 at the rearward end of the machine (Figure 3), and pushing the cross rod 27 downward in the slot 28 until the forward portion of the machine, located between the side plates 55, rises sufficiently to take its weight off the main machine. During this operation a pivoting action takes place around the axis of the circular members 17 at the top of the forward legs 10, immediately above the U-shaped member 13.

Another method of relieving heavy contact between gears 164 and 166 is to maintain a given adjustment at the slot 28 and to change the height of the pivot point 17 by raising the frame members 13 with respect to the stationary legs 10. This can be done by loosening the cap screws 14 in the vertical slots 15 (Figures 1 and 2) and sliding the members 13 upwardly to such a position as to cause the gear 166 of the manifolding attachment to move slightly away from the idler gear 164 of the printing machine, as will be clear from Figure 22, thus relieving any undue pressure between the teeth of these meshing gears. In this case, the side frame members 21, 22 pivot about the trunnions 17 (Figure 1).

Meanwhile, the paper webs 161 have been threaded through the machine from the lower pan 61, over the paper guide 103 (Figure 10), under the main machine platen 86 (the gripping rolls having been completely released), and up along the front of the machine and over the top drums 132 thereof, past the paper guides 77 and down into the upper pan or tray 64. In order to permit this threading the guide frame or bale 134 is swung outwardly away from the sprocket chains 178, pivoting around the upper shaft 131, as shown in Figures 12 to 14. The apertures 163 in the paper webs 161 are then placed over the driving pins 180, and the guide frame 134 returned to its Figure 10 position of holding the paper in place upon the pins 180.

The carbon copying ribbons are then fed out of their spools 181 within the ribbon container 182, and over their various guide rollers (Figure 18), through the space between the clamping jaws 211 and 212 of the ribbon carriage 208, and around the oblique edge 214 and along the front of the main platen 86. The carbon ribbons 194 are then threaded between the different paper webs 161 (Figure 19), and through the space between the flange 304 and the pin wheel 252. The knob 286 of the ribbon-feeding unit 261 is then raised so that the operator may rotate the pin wheel 252 and thread the carbon ribbons 194 upon the pointed pins 251 of the pin wheel, as shown in Figure 27. The knob 286 is then released so that the pin wheel 252 is now connected to its driving mechanism.

The motor switch 42 is then thrown so as to start the motor 43. The latter rotates idly without driving the mechanism, since the clutch 257 does not become operative until its clutch-tripping arm 262 is shifted in response to a line spacing or ejection spacing operation of the main machine. As previously stated, the main machine is provided with printing or typing mechanism, together with its own ribbon for producing a typed impression upon the outermost paper web 161. This impression is transmitted to the other paper webs by the carbon paper copying ribbons 194. After the line has been typed the main machine rotates the main platen 86 for a line spacing operation. As the gripping rolls of the main platen have been released the main platen performs no feeding function. Its rotation, however, is transmitted by the gearing to the sprocket chains 178, and thence to the sprocket chain pins 180, causing these to move the paper webs 161 upward for a single line space (Figure 10).

When the main machine operates in this manner to bring about this line spacing action, the detent roller arm 110, associated with the main platen 86, moves rearwardly (Figures 1 and 47), shifting the lower end of the lever 316 rearwardly. This action, through the subsequent mechanism previously described, causes the finger 348 (Figure 37) to be withdrawn from above the clutch-tripping arm 262, permitting the latter to rise under the urge of the spring 343. The rise of the clutch-tripping arm 262 causes the clutch 257 to bring about a single revolution of the ribbon-feed shaft 223, which then halts in the manner previously described. The rotation of the ribbon-feed shaft 223 thereupon brings about two actions. The first action is to operate the cam 224 to clamp the jaws 211 and 212 upon the carbon copying ribbons 194 (Figures 30 and 34), whereas the second action, occurring substantially simultaneously with the first, is to rotate the pin wheel 252 through the previously described mechanism to feed the ribbons 194 across the main platen 86, through a single predetermined distance or step.

As the ribbon carriage 208 has been clamped by its jaws 211 and 212 to the ribbons 194 during this operation, it slides laterally with the ribbons from the position of Figure 28 to that of Figure 29. The continued rotation of the cam 224, however, into the position of Figure 35 automatically releases the clamping jaws 211 and 212 (Figure 31). This occurs near the end of the operation of the ribbon feeding pin wheel 252. When thus released the ribbon carriage 208 slides back from its Figure 29 position to its Figure 28 position, under the urge of the spring 250. In the manner previously described, this action withdraws an additional length of ribbon from the ribbon container 182, at the same time creasing the ribbons transversely, as at 195, (Figure 18) so as to reduce their tendency to curl.

The main machine now executes an additional typing operation and types another line on the paper webs 161. This action continues until the typing upon the form has been completed. The form is then ejected by an ejection spacing operation of the main machine. This, in effect, moves the paper forms through a plurality of line spaces so as to bring the starting point of the next paper form into the typing position. When this ejection spacing operation occurs, the rod 119 moves rearwardly (Figures 46 and 47), thereby causing the clutch 257 to be operated a plurality of revolutions, in this instance two revolutions, while the finger 348 is held in its retracted position by the hooked arm 370 (Figure 37).

The dropping of the arm 370, it will be recalled, also drops the arm 372 into the cam 388, which moves the arm 372 and its connected arms sidewise along the shaft 368 until the arm 372 rises up on the cylindrical cam portion 390 and releases the finger 348 so that the latter can resume its function of locking the clutch-tripping arm 262 in its downward or inoperative position, as shown in Figure 37. It will be recalled that this clutch-tripping arm 262 always is returned by the clutch mechanism to its inoperative position at the end of each revolution of the clutch output shaft. During this operation of ejection spacing the pin wheel 252 has fed two lengths of the copying ribbons along the main platen 86 instead of a single length, as in line spacing. This action reduces the tendency for the copying ribbons to adhere to the paper forms. The paper forms, which have been printed upon, thus pass over the top of the machine and down into the upper pan 64, whence they may be removed whenever it is desired to do so.

It will be understood that it is desired to comprehend within the invention such modifications as come within the scope of the claims and the invention.

Having thus fully described the invention, what is claimed as new and desired to be secured by Letters Patent, is:

1. In a manifolding attachment for a record printing machine, a stationary supporting structure, a frame mounted thereon, a superstructure longitudinally slidably mounted on said frame and adapted to register with the printing portion of said machine, said superstructure being longitudinally slidable towards and away from said printing portion of said machine, means on said superstructure for supporting and moving a plurality of record sheets, and additional means on said superstructure for supporting and moving a carbon ribbon between said sheets.

2. In a manifolding attachment for a record printing machine, a supporting structure, a frame mounted thereon, a superstructure slidably mounted on said frame and adapted to register with the printing portion of said machine, means on said superstructure for supporting and moving a plurality of record sheets, and additional means on said superstructure for supporting and moving a carbon ribbon between said sheets, said superstructure being telescopingly extensible and retractable relatively to said frame.

3. In a manifolding attachment for a record printing machine, a supporting structure, a frame mounted thereon, a superstructure slidably mounted on said frame and adapted to register with the printing portion of said machine, means on said superstructure for supporting and moving a plurality of record sheets, additional means on said superstructure for supporting and moving a carbon ribbon between said sheets, said superstructure being telescopingly extensible and retractable relatively to said frame, and a device arranged between said frame and said superstructure and adapted to limit the relative motion therebetween.

4. In a manifolding attachment for a record printing machine, a frame, a copying ribbon container of circular configuration mounted on said frame, means for guiding and feeding said ribbon from said container past the printing position of said record printing machine, and ribbon holders loosely mounted and freely movable within said container, said container having a ribbon outlet aperture with a relatively straight unobstructed edge at one side thereof, said edge being relatively sharp and so positioned with respect to the moving ribbon as to cause transverse creases to appear along the length of the ribbon in order to flatten the ribbon as it leaves the container.

5. In a manifolding attachment for a record printing machine, a frame, a copying ribbon container mounted on said frame, means for guiding and feeding said ribbon from said container past the printing position of said record printing machine, ribbon holders loosely mounted and freely movable within said container, said container having a ribbon outlet aperture with a relatively straight edge at one side thereof, and means for withdrawing said ribbon by a jerking motion and with an acute angle bend from said container whereby to impart transverse creases to said ribbon.

6. In a manifolding attachment for a record printing machine, a frame, a copying ribbon container of circular configuration mounted on said frame, means for guiding and feeding said ribbon from said container past the printing position of said record printing machine, and ribbon holders loosely mounted and freely movable within said container, said container having a ribbon outlet aperture with a relatively straight unobstructed edge at one side thereof and said ribbon bending around said edge in an acute angled bend as it leaves said container in order to reduce the curl of the ribbon after it leaves the container.

7. In a manifolding attachment for a record printing machine, a frame, a copying ribbon container mounted on said frame, means for guiding and feeding said ribbon from said container past the printing position of said record printing machine, ribbon holders mounted in said container, and means for transversely creasing the ribbon emerging from said container by giving it an acute angle bend before it moves past said printing position.

8. In a manifolding attachment for a record printing machine, a frame, a copying ribbon holder stationarily mounted thereon, a ribbon carriage movably mounted on said frame and spaced from said ribbon holder, ribbon-feeding mechanism, means for transversely creasing and guiding the copying ribbon from said holder past said carriage to said ribbon-feeding mechanism, said carriage being moved in one direction in response to the feeding motion of said ribbon-feeding mechanism, and means for moving said carriage in the opposite direction to withdraw additional ribbon from said holder.

9. In a manifolding attachment for a record printing machine, a frame, a copying ribbon holder stationarily mounted thereon, a ribbon carriage movably mounted on said frame and spaced from said ribbon holder, ribbon-feeding mechanism, means for transversely creasing and guiding the copying ribbon from said holder past said carriage to said ribbon-feeding mechanism, said carriage being moved in one direction in response to the feeding motion of said ribbon-feeding mechanism, and yielding means for moving said carriage in the opposite direction to withdraw additional ribbon from said holder.

10. In a manifolding attachment for a record printing machine, a frame, a copying ribbon holder stationarily mounted thereon, a ribbon carriage movably mounted on said frame and spaced from said ribbon holder, ribbon-feeding mechanism, means for transversely creasing and guiding the copying ribbon from said holder past said carriage to said ribbon-feeding mechanism, said carriage being moved in one direction in response to the feeding motion of said ribbon-feeding mechanism, and means for moving said carriage in the opposite direction to withdraw additional ribbon from said holder, said carriage having an angled guiding portion thereon for changing the direction of the ribbon emerging therefrom to a direction at lateral right angles to the entering direction thereof, said guiding portion being disposed against the face of the ribbon at an acute angle to the longitudinal axis thereof.

11. In a manifolding attachment for a record printing machine, a frame, a copying ribbon holder mounted thereon, a ribbon carriage movably mounted on said frame, said carriage being movable relative to said holder, ribbon-feeding mechanism, means for guiding the copying ribbon from said holder past said carriage to said ribbon-feeding mechanism, said carriage being moved in one direction in response to the feeding motion of said ribbon-feeding mechanism, means including a device operable on movement of said carriage in the opposite direction for withdrawing additional ribbon from said holder, and means on said carriage for gripping said ribbon during the feeding motion of said ribbon-feeding mechanism.

12. In a manifolding attachment for a record printing machine, a frame, a copying ribbon holder mounted thereon, a ribbon carriage movably mounted on said frame, said carriage being movable relative to said holder, ribbon-feeding mechanism, means for guiding the copying ribbon from said holder past said carriage to said ribbon-feeding mechanism, said carriage being moved in one direction in response to the feeding motion of said ribbon-feeding mechanism, means including a device operable on movement of said carriage in the opposite direction for withdrawing additional ribbon from said holder, means on said carriage for gripping said ribbon during the feeding motion of said ribbon-feeding mechanism, and devices drivingly connected to said ribbon-feeding mechanism and synchronized with the motion thereof for clamping and unclamping said ribbon-gripping means, said ribbon-feeding mechanism being positively engaged with said ribbon during the release of the gripping means on said carriage.

13. In a manifolding attachment for a record printing machine, a frame, a copying ribbon holder mounted thereon, a ribbon carriage movably mounted on said frame, said carriage being movable relative to said holder, ribbon-feeding mechanism, means for guiding said copying ribbon from said holder past said carriage to said ribbon-feeding mechanism, a clamping member on said carriage, and devices responsive to the operation of said ribbon-feeding mechanism for moving said clamping member into clamping engagement with said ribbon whereby to cause said ribbon to move said carriage in one direction during the operation of said ribbon-feeding mechanism.

14. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, and devices responsive to the operation of said ribbon-feeding mechanism for moving said clamping member into clamping engagement with said ribbon whereby to cause said ribbon to move said carriage in one direction during the operation of said ribbon-feeding mechanism, said devices being responsive to the halting of said ribbon-feeding mechanism for disengaging said clamping member from clamping engagement with said ribbon.

15. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, devices responsive to the operation of said ribbon-feeding mechanism for moving said clamping member into clamping engagement with said ribbon whereby to cause said ribbon to move said carriage in one direction during the operation of said ribbon-feeding mechanism, said devices being responsive to the halting of said ribbon-feeding mechanism for disengaging said clamping member from clamping engagement with said ribbon, and means including a device operable on the return of said carriage to its original position for withdrawing an additional length of ribbon from said ribbon holder, said ribbon-feeding mechanism being positively engaged with said ribbon during the release of the clamping member on the carriage.

16. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, devices responsive to the operation of said ribbon-feeding mechanism for moving said clamping member into clamping engagement with said ribbon whereby to cause said ribbon to move said carriage in one direction during the operation of said ribbon-feeding mechanism, and an angled portion associated with said carriage for causing the ribbon to emerge from said carriage at an angle to its entering direction, said angled portion being disposed against the face of the ribbon at an acute angle to the longitudinal axis thereof.

17. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, devices responsive to the operation of said ribbon-feeding mechanism for moving said clamping member into clamping engagement with said ribbon whereby to cause said ribbon to move said carriage in one direction during the operation of said ribbon-feeding mechanism, and an angled portion adjacent said clamping member for causing the ribbon to pass therearound and emerge substantially at right angles to its entering direction, said angled portion being disposed at an acute angle to the longitudinal axis of the ribbon.

18. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, a shaft operatively connected to said ribbon-feeding mechanism and synchronized with the motion thereof, and cam means on said shaft engaging said clamping member for moving said clamping member into clamping engagement with said ribbon in response to the operation of said ribbon-feeding mechanism whereby to cause said ribbon to move said carriage in one direction during the operation of said ribbon-feeding mechanism.

19. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, a shaft operatively connected to said ribbon-feeding mechanism and synchronized with the motion thereof, and cam means on said shaft engaging said clamping member for moving said clamping member into clamping engagement with said ribbon in response to the operation of said ribbon-feeding mechanism whereby to cause said ribbon to move said carriage in one direction during the operation of said ribbon-feeding mechanism, said cam being operative to disengage said clamping member from clamping engagement with said ribbon in response to the halting of said ribbon-feeding mechanism.

20. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, a shaft operatively connected to said ribbon-feeding mechanism and synchronized with the motion thereof, cam means on said shaft engaging said clamping member for moving said clamping member into clamping engagement with said ribbon in response to the operation of said ribbon-feeding mechanism whereby to cause said ribbon to move said carriage in one direction during the operation of said ribbon-feeding mechanism, said cam being operative to disengage said clamping member from clamping engagement with said ribbon in response to the halting of said ribbon-feeding mechanism, and means for returning said carriage to its original position.

21. In a manifolding attachment for a record printing machine, a frame, a copying ribbon holder mounted thereon, a ribbon carriage movably mounted on said frame, ribbon-feeding mechanism, means for guiding said copying ribbon from said holder past said carriage to said ribbon-feeding mechanism, a clamping member on said carriage, a shaft operatively connected to said ribbon-feeding mechanism and synchronized with the motion thereof, cam means on said shaft engaging said clamping member for moving said clamping member into clamping engagement with said ribbon in response to the operation of said ribbon-feeding mechanism whereby to cause said ribbon to move said carriage in one direction during the operation of said ribbon-feeding mechanism, said cam being operative to disengage said clamping member from clamping engagement with said ribbon in response to the halting of said ribbon-feeding mechanism, and a resilient device for returning said carriage to its original position.

22. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, a motor, clutch means connected between said motor and said ribbon-feeding mechanism, and means responsive to a feeding motion of said record sheet moving means for actuating said clutch to operatively connect said motor to said ribbon-feeding mechanism.

23. In a manifolding attachment for a record-printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, a motor, clutch means connected between said motor and said ribbon-feeding mechanism, and means responsive to a feeding motion of said record sheet moving means for actuating said clutch to operatively connect said motor to said ribbon-feeding mechanism, said clutch when so actuated being adapted to cause said ribbon-feeding mechanism to move a predetermined amount and then halt.

24. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, mechanism for selectively actuating said record sheet moving means to move said record sheets through a line spacing distance, and means responsive to a line spacing operation of said record sheets moving means for operating said ribbon-feeding mechanism to feed said ribbon a predetermined distance.

25. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, mechanism for selectively actuating said record sheet moving means to move said record sheets through a line spacing distance or through a record sheet ejection distance, and means responsive to a line spacing operation of said record sheet moving means for operating said ribbon-feeding mechanism to feed said ribbon a predetermined distance and responsive to a record sheet ejection operation to feed said ribbon a different predetermined distance.

26. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, said record printing machine having a platen selectively rotatable in line spacing or ejection spacing operations upon said record sheets, mechanism drivingly connecting said record sheet moving means to said platen, and means responsive to the motion of said platen for actuating said ribbon-feeding mechanism.

27. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, said record printing machine having a platen selectively rotatable in line spacing operations upon said record sheets, mechanism drivingly connecting said record sheet moving means to said platen, and means selectively responsive to a line spacing motion of said platen for actuating said ribbon-feeding mechanism to feed said ribbon a predetermined distance.

28. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, said record printing machine having a platen selectively rotatable in line spacing or ejection spacing operations upon said record sheets, mechanism drivingly connecting said record sheet moving means to said platen, and means selectively responsive to a line spacing motion of said platen for actuating said ribbon-feeding mechanism to feed said ribbon a predetermined distance, and responsive to an ejection motion of said platen for actuating said ribbon-feeding mechanism to feed said ribbon a different predetermined distance.

29. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, said record printing machine having a platen selectively rotatable in line spacing operation upon said record sheets, mechanism drivingly connecting said record sheet moving means to said platen, a motor, a clutch connected between said motor and said ribbon-feeding mechanism, and means selectively responsive to a line spacing motion of said platen for actuating said clutch to operate said ribbon-feeding mechanism a predetermined distance.

30. In a manifolding attachment for a record printing machine, a frame, a copying ribbon holder mounted thereon, ribbon-feeding mechanism, means for guiding said copying ribbon from said holder past the printing position of said record printing machine to said ribbon-feeding mechanism, means for supporting and moving a plurality of record sheets past said printing position, said record printing machine having a platen selectively rotatable in line spacing or ejection spacing operations upon said record sheets, mechanism drivingly connecting said record sheet moving means to said platen, a motor, a clutch connected between said motor and said ribbon-feeding mechanism, and means selectively responsive to a line spacing motion of said platen for actuating said clutch to operate said ribbon-feeding mechanism a predetermined distance, and responsive to an ejection motion of said platen for actuating said clutch to operate said ribbon-feeding mechanism a different predetermined distance.

31. In a manifolding attachment for a record printing machine, a stationary supporting structure, a frame pivotally mounted thereon, a supporting frame for the manifolding mechanism mounted on and movable in unison with said first mentioned frame and adapted to register with and rest upon the printing portion of said machine, said first mentioned frame being fixed against lateral movement relative to said supporting structure, means on said last mentioned frame for supporting and moving a plurality of record sheets, and means for adjustably moving said first mentioned frame about its pivotal mounting and relatively to said supporting structure and said printing machine whereby to lessen the thrust exerted by the weight of said attachment upon said printing machine.

32. In a manifolding attachment for a record printing machine, a stationary supporting structure, a frame pivotally mounted thereon, a supporting frame for the manifolding mechanism mounted on and movable in unison with said first mentioned frame and adapted to register with and rest upon the printing portion of said machine, said first mentioned frame being fixed against lateral movement relative to said supporting structure, means on said last mentioned frame for supporting and moving a plurality of record sheets, means for adjustably moving said first mentioned frame about its pivotal mounting and relatively to said supporting structure and said printing machine whereby to lessen the thrust exerted by the weight of said attachment upon said printing machine, and means for clamping said first mentioned frame in its thrust-lessening position.

33. In a manifolding attachment for a record printing machine, a stationary supporting structure, a frame pivotally mounted thereon and adapted to register with and rest upon the printing portion of said machine, means on said frame for supporting and moving a plurality of record sheets, said frame having a portion thereof extending away from the pivotal mounting thereof in the opposite direction from said record sheet supporting means in the manner of a fulcrumed lever, said lever portion being adjustably movable for moving said frame about the pivotal mounting of said frame in a direction adapted to raise the adjacent portion of said frame relatively to said printing machine whereby to lessen the thrust exerted by the weight of said attachment upon said printing machine.

34. In a manifolding attachment for a record printing machine, a stationary supporting structure, a frame pivotally mounted thereon, a supporting frame for the manifolding mechanism mounted on and movable in unison with said first mentioned frame and adapted to register with and rest upon the printing portion of said machine, said first mentioned frame being fixed against lateral movement relative to said supporting structure, means on said last mentioned frame for supporting and moving a plurality of record sheets, means for adjustably moving said first mentioned frame about its pivotal mounting and relatively to said supporting structure and said printing machine whereby to lessen the thrust exerted by the weight of said attachment upon said printing machine, and means for folding said second mentioned frame relative to said first mentioned frame about said second mentioned pivot.

35. In a manifolding attachment for a record printing machine, a stationary supporting structure, a frame pivotally mounted thereon and adapted to register with and rest upon the printing portion of said machine, means on said frame for supporting and moving a plurality of record sheets, said frame having a portion thereof extending away from the pivotal mounting thereof in the opposite direction from said record sheet supporting means in the manner of a fulcrumed lever, said lever portion being adjustably movable for moving said frame portion about the pivotal mounting of said frame in a direction adapted to raise the adjacent portion of said frame relatively to said printing machine whereby to lessen the thrust exerted by the weight of said attachment upon said printing machine, means for clamping said frame lever portion to said supporting structure in the thrust-lessening position of said frame, and latch means carried by said pivot for positioning said attachment in operating relation with respect to said printing machine.

36. In a manifolding attachment for a record printing machine, a supporting structure, a frame adjustably carried by said structure, and a manifolding attachment including paper feeding mechanism pivotally mounted on said frame, said frame being adapted to be moved in a vertical direction with respect to said supporting structure in order to regulate the height of said attachment with respect to the printing machine.

37. In a manifolding attachment for a record printing machine, a supporting structure including a pair of spaced uprights, a frame pivoted at one end to one of the uprights and pivoted at an intermediate point to the other of the uprights whereby a portion of the frame extends beyond the last mentioned upright, a manifolding attachment secured to the extending end of said frame, and means for adjusting the height of the frame at said intermediate pivot point in order to change the vertical position of the attachment with respect to the position of the record printing machine.

WILLIAM C. PFEIFFER.